United States Patent
Tashiro et al.

(10) Patent No.: US 9,849,793 B2
(45) Date of Patent: Dec. 26, 2017

(54) ELECTRICAL STORAGE SYSTEM FOR VEHICLE

(71) Applicant: TOYOTA JIDOSHA KABUSHIKI KAISHA, Toyota-shi, Aichi-ken (JP)

(72) Inventors: Hiroki Tashiro, Aichi-ken (JP); Hiromasa Tanaka, Okazaki (JP); Yuji Nishi, Nagoya (JP); Yukinari Tanabe, Nagoya (JP); Hiroyuki Kaiya, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/026,110

(22) PCT Filed: Oct. 1, 2014

(86) PCT No.: PCT/IB2014/001994
§ 371 (c)(1),
(2) Date: Mar. 30, 2016

(87) PCT Pub. No.: WO2015/052567
PCT Pub. Date: Apr. 16, 2015

(65) Prior Publication Data
US 2016/0236581 A1 Aug. 18, 2016

(30) Foreign Application Priority Data
Oct. 8, 2013 (JP) ................................. 2013-211141

(51) Int. Cl.
*B60L 11/18* (2006.01)
*B60L 3/00* (2006.01)
(Continued)

(52) U.S. Cl.
CPC ............ *B60L 11/1811* (2013.01); *B60L 1/00* (2013.01); *B60L 3/0046* (2013.01); *B60L 7/14* (2013.01);
(Continued)

(58) Field of Classification Search
None
See application file for complete search history.

(56) References Cited

U.S. PATENT DOCUMENTS

2010/0019729 A1    1/2010  Kaita et al.
2010/0241376 A1    9/2010  Kikuchi et al.
(Continued)

FOREIGN PATENT DOCUMENTS

JP    2004-229447 A    8/2004
JP    2009-123435 A    6/2009
(Continued)

*Primary Examiner* — Rami Khatib
(74) *Attorney, Agent, or Firm* — Sughrue Mion, PLLC

(57) ABSTRACT

An electrical storage system includes a main battery, an auxiliary battery, a bidirectional DC-DC converter and a controller. The bidirectional DC-DC converter is provided between the auxiliary battery and a power supply path from the main battery to a driving motor. The bidirectional DC-DC converter steps down an output voltage from the power supply path to the auxiliary battery, and steps up an output voltage from the auxiliary battery to the power supply path. The controller controls charging and discharging of the auxiliary battery. The controller, when an allowable output power of the main battery decreases and an electric power becomes insufficient for a required vehicle output, supplies an electric power to the power supply path by discharging the auxiliary battery by using the bidirectional DC-DC converter. The controller, when an allowable input power of the main battery decreases and a regenerated electric power generated by the driving motor is not entirely charged into (Continued)

the main battery, charges part of the regenerated electric power into the auxiliary battery by using the bidirectional DC-DC converter.

4 Claims, 15 Drawing Sheets

(51) Int. Cl.
*B60L 1/00* (2006.01)
*B60L 7/14* (2006.01)
*B60L 7/18* (2006.01)
*H01M 10/44* (2006.01)
*H02J 7/00* (2006.01)
*H01M 10/48* (2006.01)
*H01M 16/00* (2006.01)

(52) U.S. Cl.
CPC ............ *B60L 7/18* (2013.01); *B60L 11/1857* (2013.01); *B60L 11/1859* (2013.01); *B60L 11/1861* (2013.01); *B60L 11/1862* (2013.01); *B60L 11/1868* (2013.01); *B60L 11/1872* (2013.01); *H01M 10/44* (2013.01); *H01M 10/48* (2013.01); *H02J 7/0029* (2013.01); *H02J 7/0075* (2013.01); *H02J 7/0091* (2013.01); *B60L 2210/10* (2013.01); *B60L 2210/12* (2013.01); *B60L 2210/14* (2013.01); *B60L 2240/545* (2013.01); *B60L 2240/547* (2013.01); *B60L 2240/549* (2013.01); *H01M 10/486* (2013.01); *H01M 16/00* (2013.01); *H01M 2220/20* (2013.01); *H02J 2007/004* (2013.01); *H02J 2007/0037* (2013.01); *H02J 2007/0039* (2013.01); *Y02T 10/7005* (2013.01); *Y02T 10/7044* (2013.01); *Y02T 10/7066* (2013.01); *Y02T 10/7225* (2013.01); *Y02T 10/7233* (2013.01)

(56) References Cited

U.S. PATENT DOCUMENTS

| | | | | |
|---|---|---|---|---|
| 2013/0038270 | A1* | 2/2013 | Endo | H02J 7/0019 320/103 |
| 2014/0015456 | A1* | 1/2014 | Nishio | B60L 7/14 318/376 |
| 2014/0184153 | A1* | 7/2014 | Saint-Leger | H02J 7/00 320/108 |
| 2014/0362605 | A1* | 12/2014 | Jang | H02M 3/3353 363/17 |
| 2015/0214761 | A1* | 7/2015 | Kono | B60L 9/18 320/107 |
| 2015/0298568 | A1* | 10/2015 | Mitsutani | B60L 11/1868 307/9.1 |
| 2015/0326066 | A1* | 11/2015 | Yamada | H01M 10/44 318/440 |

FOREIGN PATENT DOCUMENTS

| | | |
|---|---|---|
| JP | 2010-029051 A | 2/2010 |
| JP | 2010-060406 A | 3/2010 |
| JP | 2011-199934 A | 6/2011 |
| JP | 2013-125607 A | 6/2013 |

* cited by examiner

ELECTRICAL STORAGE SYSTEM FOR VEHICLE

BACKGROUND OF THE INVENTION

1. Field of the Invention

The invention relates to an electrical storage system that is mounted on a vehicle.

2. Description of Related Art

It is known that battery degradation is accelerated when the internal resistance of a secondary battery increases because of excessive charge and discharge. In Japanese Patent Application Publication No. 2010-060406 (JP 2010-060406 A), input and output powers of a secondary battery are limited on the basis of an estimated degree of increase in the internal resistance. Thus, battery degradation is suppressed.

SUMMARY OF THE INVENTION

However, in a state where the output (discharge) of the battery is limited, for example, the output of the battery becomes insufficient for a vehicle request. In a state where the input (charge) of the battery is limited, for example, regenerated electric power is not entirely charged into the battery, so energy efficiency decreases and fuel economy deteriorates.

The invention provides an electrical storage system in which a main battery and an auxiliary battery are connected in parallel with each other via a bidirectional DC-DC converter, an insufficient electric power resulting from an input/output limitation set in view of protection of the main battery is supplied from the auxiliary battery, and deterioration of fuel economy is suppressed while keeping supply of electric power that satisfies a vehicle request. The main battery supplies electric power to a vehicle driving motor. The auxiliary battery supplies electric power to an auxiliary mounted on the vehicle.

An aspect of the invention provides an electrical storage system. The electrical storage system includes a main battery, an auxiliary battery, a bidirectional DC-DC converter and a controller. The main battery is configured to supply an electric power to a driving motor of a vehicle. The auxiliary battery is configured to supply an electric power to an auxiliary mounted on the vehicle. The bidirectional DC-DC converter is provided between the auxiliary battery and a power supply path from the main battery to the driving motor. The bidirectional DC-DC converter is configured to step down an output voltage from the power supply path to the auxiliary battery, and is configured to step up an output voltage from the auxiliary battery to the power supply path.

The controller is configured to control charging and discharging of the auxiliary battery. The controller is configured to, when an allowable output power of the main battery decreases and an electric power becomes insufficient for a required vehicle output, supply an electric power to the power supply path by discharging the auxiliary battery by using the bidirectional DC-DC converter. The controller is configured to, when an allowable input power of the main battery decreases and a regenerated electric power generated by the driving motor is not entirely charged into the main battery, charge part of the regenerated electric power into the auxiliary battery by using the bidirectional DC-DC converter.

According to the above aspect, for example, even when the allowable output power is reduced in view of protection of the main battery, it is possible to compensate for the amount of electric power insufficient for the required vehicle output with an electric power from the auxiliary battery. Therefore, it is possible to keep supply of an electric power that satisfies a vehicle request. Even when the allowable input power is reduced in view of protection of the main battery, it is possible to charge part of regenerated electric power into the auxiliary battery when the regenerated electric power is not entirely charged into the main battery. Therefore, energy efficiency improves, and it is possible to suppress deterioration of fuel economy.

In the above aspect, the main battery may be a non-aqueous secondary battery. When the main battery is a non-aqueous secondary battery, the controller may be configured to control a discharge electric power so that the discharge electric power does not exceed the allowable output power. The controller may be configured to calculate an evaluation value. The evaluation value may be a value for evaluating a degradation component that reduces output performance of the main battery as a result of a bias of an ion concentration in an electrolyte of the main battery due to discharging of the main battery on the basis of a current value during charging and discharging of the main battery. The controller may be configured to reduce the allowable output power when the evaluation value exceeds a target value.

The controller may be configured to, when the evaluation value indicates a state where the ion concentration is biased toward a discharge side before the evaluation value exceeds the target value, discharge the auxiliary battery by using the bidirectional DC-DC converter and charge an electric power from the auxiliary battery into the main battery. By charging the main battery in a direction opposite to discharging in this way, it is possible to eliminate degradation resulting from a bias of the ion concentration due to discharging of the main battery. Therefore, it is possible to suppress a decrease in the allowable output power based on degradation resulting from a bias of the ion concentration.

In the above aspect, the controller may be configured to discharge the auxiliary battery by using the bidirectional DC-DC converter continuously after the evaluation value exceeds the target value, and charge an electric power from the auxiliary battery into the main battery. By reducing the allowable output power, it is possible to eliminate the state where the ion concentration is biased toward the discharge side while suppressing degradation resulting from the bias of the ion concentration. Therefore, it is possible to shorten a time during which an output limitation is imposed on the allowable output power.

In the above aspect, the controller may be configured to calculate a second evaluation value on the basis of the current value during charging and discharging of the main battery. The second evaluation value may be a value for evaluating a degradation component that reduces input performance of the main battery as a result of a bias of the ion concentration in the electrolyte due to charging of the main battery. The controller may be configured to reduce the allowable input power when the second evaluation value exceeds a second target value. The controller may be configured to, when the evaluation value indicates the state where the ion concentration is biased toward the discharge side, set a target SOC of an SOC of the auxiliary battery to a first SOC value higher than a predetermined SOC value. The controller may be configured to, when the second evaluation value indicates a state where the ion concentration is biased toward a charge side, set the target SOC of the SOC of the auxiliary battery to a second SOC value lower than the predetermined SOC value, and control charging and discharging of the auxiliary battery in accordance with the set target SOC. With this configuration, it is possible to ensure a large amount of electric power that is output from the auxiliary battery for a vehicle request at the time when the allowable output power is reduced. It is possible to ensure a large capacity for charging a regenerated electric power that is not entirely charged into the main battery at the time when the allowable input power is reduced.

In the above aspect, the controller may be configured to calculate a limited amount for reducing the allowable output power and a limited amount for reducing the allowable input power on the basis of each of first input/output limitations, second input/output limitations and third input/output limitations. The first input/output limitations, the second input/output limitations and the third input/output limitations are used for a non-aqueous secondary battery as the main battery. The first input/output limitations may be limitations for suppressing degradation that reduces input/output performance of the main battery as a result of a bias of an ion concentration in an electrolyte of the main battery due to charging and discharging of the main battery The second input/output limitations may be limitations for suppressing a temperature of a current-carrying component electrically connected to the main battery. The third input/output limitations may be limitations for suppressing an excess of an upper limit voltage or lower limit voltage of the main battery. The controller may be configured to supply an electric power to the power supply path by discharging the auxiliary battery and charge part of the regenerated electric power into the auxiliary battery on the basis of the calculated largest pair of limited amounts among the pairs of limited amounts. With this configuration, by reducing the allowable output power and the allowable input power on the basis of the most necessary pair of limited amounts from among the plurality of pairs of input/output limitations, it is possible to keep supply of an electric power that satisfies a vehicle request and suppress deterioration of fuel economy while appropriately protecting the main battery.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
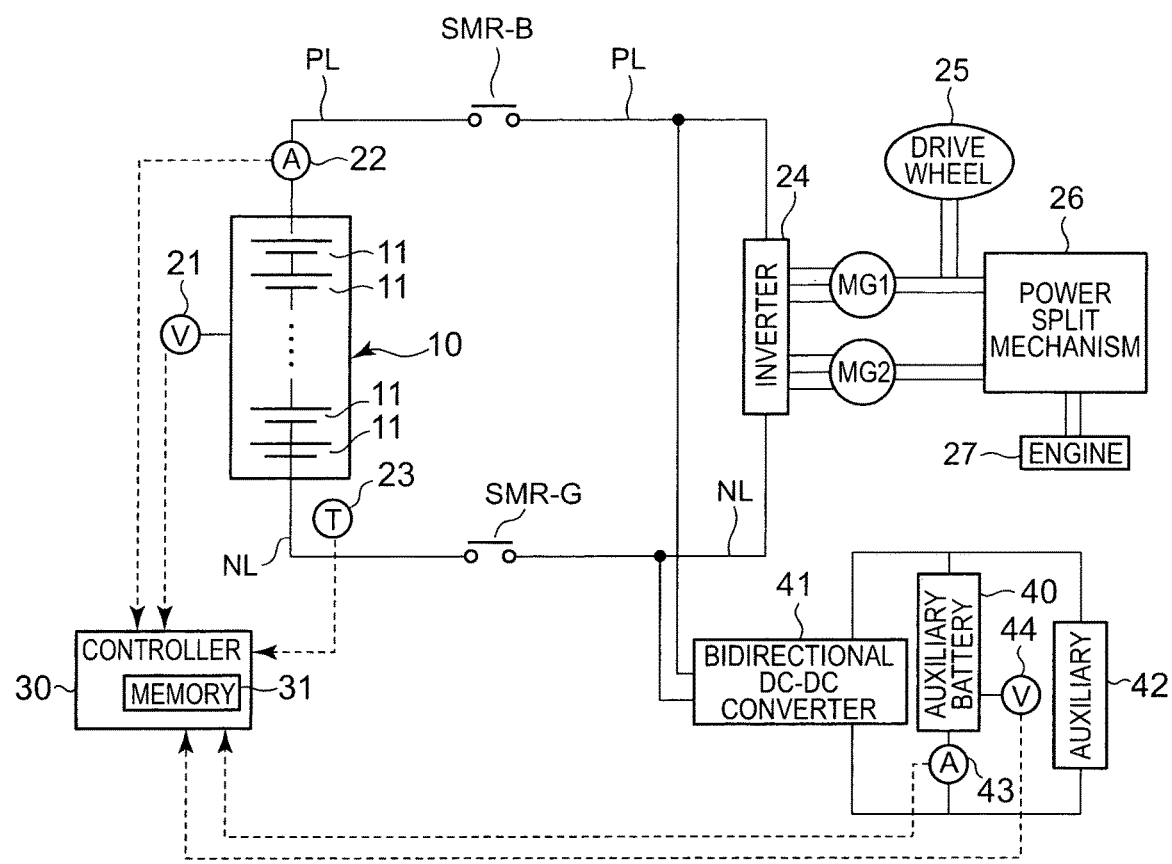
FIG. 1 is a view that shows the configuration of a battery system according to a first embodiment.

Hereinafter, embodiments of the invention will be described. A first embodiment will be described FIG. 1 is a view that shows the configuration of a battery system according to the present embodiment. The battery system according to the present embodiment may be mounted on a vehicle. The vehicle is a hybrid vehicle or an electric vehicle. The battery system shown in FIG. 1 is an example in which the battery system is mounted on the hybrid vehicle. The electric vehicle includes only a battery pack (described later) as a power source for propelling the vehicle.

A battery pack 10 is a main battery that supplies electric power for propelling the vehicle. The battery pack 10 includes a plurality of single cells 11 connected in series with each other. A secondary battery, such as a nickel-metal hydride battery and a lithium ion battery, may be used as each single cell 11. Instead of a secondary battery, an electric double layer capacitor may be used.

The number of the single cells 11 that constitute the battery pack 10 may be set as needed in consideration of, for example, a required output of the battery pack 10. In the present embodiment, the battery pack 10 is formed by connecting all the single cells 11 in series with each other. Instead, the battery pack 10 may include a plurality of the single cells 11 connected in parallel with each other.

When each single cell 11 is a non-aqueous electrolyte secondary battery, such as a lithium ion battery, for example, a positive electrode of each single cell 11 is made of a material that is able to occlude or release ions (for example, lithium ions). For example, lithium cobalt oxide or lithium manganese oxide may be used as the material of the positive electrode. A negative electrode of each single cell 11 is made of a material that is able to occlude or release ions (for example, lithium ions). For example, carbon may be used as the material of the negative electrode. When each single cell 11 is charged, the positive electrode releases ions into the electrolytic solution, and the negative electrode occludes ions in the electrolytic solution. When each single cell 11 is discharged, the positive electrode occludes ions in the electrolytic solution, and the negative electrode releases ions into the electrolytic solution.

A voltage sensor 21 detects the terminal voltage of the battery pack 10, or detects the voltage of each single cell 11. The voltage sensor 21 outputs detected results to a controller 30. The voltage sensor 21 is able to detect the voltage value of each of the plurality of single cells 11. The voltage sensor 21 is able to detect the voltage of a group of a predetermined number of single cells connected in series with each other as one block. The number of single cells 11 included in one block may be set as needed.

A current sensor 22 detects a current flowing through the battery pack 10, and outputs a detected result to the controller 30. In the present embodiment, the current sensor 22 is provided in a positive electrode line PL connected to the positive electrode terminal of the battery pack 10; however, the current sensor 22 is not limited to this arrangement. The current sensor 22 just needs to be able to detect a current flowing through the battery pack 10, and a location in a current path, at which the current sensor 22 is provided, may be set as needed. For example, the current sensor 22 may be provided in a negative electrode line NL connected to the negative electrode terminal of the battery pack 10. A plurality of the current sensors 22 may be used.

In the present embodiment, a positive value is used as a current value detected by the current sensor 22 when the battery pack 10 is discharged. A negative value (IB<0) is used as a current value detected by the current sensor 22 when the battery pack 10 is charged. This also applies to a current sensor 43 that detects a current flowing through an auxiliary battery 40 (described later).

A temperature sensor 23 detects a temperature (battery temperature) of the battery pack 10. The temperature sensor 23 outputs a detected result to the controller 30. The temperature sensor 23 may be provided at one point of the battery pack 10 or may be provided at mutually different multiple points within the battery pack 10. When a plurality of detected temperatures are used, the temperature of the battery pack 10 may be a minimum value or a maximum value among the plurality of detected temperatures, a median value or average value of the plurality of detected temperatures, or the like, as needed.

The battery pack 10 is connected to an inverter 24 via the positive electrode line PL and the negative electrode line NL. A system main relay SMR-B is provided in the positive electrode line PL connected to the positive electrode terminal of the battery pack 10. A system main relay SMR-G is provided in the negative electrode line NL connected to the negative electrode terminal of the battery pack 10. Each of the system main relays SMR-B, SMR-G switches between an on state and an off state upon reception of a control signal from the controller 30.

The controller 30 sets the system main relays SMR-B, SMR-G to the on state when an ignition switch is in an on state. Thus, connection of the battery pack 10 with the inverter 24 completes, and the battery system shown in FIG. 1 enters an activated state (ready-on state). Information about the on/off state of the ignition switch of the vehicle is input to the controller 30. The controller 30 starts up the battery system in response to the switching of the ignition switch from the off state to the on state.

The controller 30 sets the system main relays SMR-B, SMR-G to the off state when the ignition switch is in the off state. Thus, connection of the battery pack 10 with the inverter 24 is interrupted, and the battery system enters a stopped state (ready-off state).

The inverter 24 converts direct-current power, output from the battery pack 10, to alternating-current power, and outputs the alternating-current power to a motor generator MG2. For example, a three-phase alternating-current motor may be used as the motor generator MG2. The motor generator MG2 generates kinetic energy for propelling the vehicle upon reception of alternating-current power from the inverter 24. The motor generator MG2 is connected to a drive wheel 25. Kinetic energy generated by the motor generator MG2 is transmitted to the drive wheel 25. Thus, it is possible to propel the vehicle.

When the vehicle is decelerated or stopped, the motor generator MG2 converts kinetic energy, which is generated during braking of the vehicle, to electric energy (alternating-current power). The inverter 24 converts alternating-current power, output from the motor generator MG2, to direct-current power, and outputs the direct-current power to the battery pack 10. Thus, it is possible to store regenerated electric power in the battery pack 10.

In the battery system according to the present embodiment, the battery pack 10 is connected to the inverter 24; however, the battery system is not limited to this configuration. Specifically, a step-up circuit may be provided in a current path between the battery pack 10 and the inverter 24. When the step-up circuit is used, it is possible to step up the output voltage of the battery pack 10 and output the stepped-up electric power to the inverter 24. By using the step-up circuit, it is possible to step down the output voltage of the inverter 24 and output the stepped-down electric power to the battery pack 10.

A power split mechanism 26 transmits the power of an engine 27 to the drive wheel 25 or transmits the power to the motor generator MG1. The motor generator MG1 generates electric power upon reception of the power of the engine 27. Alternating-current power generated by the motor generator MG1 is supplied to the motor generator MG2 via the inverter 24 or supplied to the battery pack 10. When the electric power generated by the motor generator MG1 is supplied to the motor generator MG2, it is possible to drive the drive wheel 25 by using kinetic energy generated by the motor generator MG2. When the electric power generated by the motor generator MG1 is supplied to the battery pack 10, it is possible to charge the battery pack 10.

The controller 30 includes a memory 31. Information for the controller 30 to execute a predetermined process (particularly, a process that will be described in the present embodiment) is stored in the memory 31. In the present embodiment, the memory 31 is incorporated in the controller 30. Instead, the memory 31 may be provided outside the controller 30. The controller 30 may be formed of a single electronic control unit (ECU) or may be formed of a plurality of ECUs. When the controller 30 is formed of a plurality of ECUs, each ECU is able to communicate with the other ECU or the other ECUs.

The controller 30 estimates the SOC of the battery pack 10 by using the detected results of the voltage sensor 21, current sensor 22 and temperature sensor 23. The controller 30 executes charge/discharge control over the battery pack 10 in response to a vehicle request on the basis of the estimated SOC and a full charge capacity.

The SOC indicates the ratio (state of charge) of a current level of charge to the full charge capacity of the battery pack 10. The full charge capacity is an upper limit value of the SOC. A known method may be employed as needed as a method of estimating the SOC, and the description of a specific method of estimating the SOC is omitted.

In the battery system according to the present embodiment, the auxiliary battery 40 is connected to the battery pack 10 via a bidirectional DC-DC converter 41. The auxiliary battery 40 is, for example, a power supply device that supplies electric power to an auxiliary (electric power consuming device) 42, such as a vehicle cabin air conditioner (an inverter, a motor, and the like, of an air conditioner), an AV device, a lighting device in a vehicle cabin and headlights, for the vehicle on which the battery system is mounted.

The bidirectional DC-DC converter 41 is connected to the positive electrode line PL between the system main relay SMR-B and the inverter 24 and to the negative electrode line NL between the system main relay SMR-G and the inverter 24. The auxiliary battery 40 is connected to the bidirectional DC-DC converter 41, and is connected in parallel with the battery pack 10. For example, a lead storage battery or a nickel-metal hydride battery may be used as the auxiliary battery 40. A nominal voltage of the auxiliary battery 40 is lower than a nominal voltage (total voltage) of the battery pack 10.

The bidirectional DC-DC converter 41 is provided between the auxiliary battery 40 and a power supply path from the battery pack 10 to the motor generator MG2 (driving motor). The bidirectional DC-DC converter 41 steps down electric power, output from the battery pack 10, or regenerated electric power, output from the motor generator MG2, and outputs the stepped-down electric power to the auxiliary battery 40. Thus, the auxiliary battery 40 is able to be charged with regenerated electric power or electric power that is output from the battery pack 10. On the other hand, the bidirectional DC-DC converter 41 steps up electric power, output from the auxiliary battery 40, and outputs the stepped-up electric power to the battery pack 10 or the motor generator MG2. Thus, it is possible to charge electric power from the auxiliary battery 40 into the battery pack 10. It is also possible to supply electric power from the auxiliary battery 40 to the inverter 24 as electric power for propelling the vehicle (electric power for driving the motor generator MG2). The bidirectional DC-DC converter 41 is controlled by the controller 30.

The bidirectional DC-DC converter 41 is also able to step down electric power, output from the battery pack 10, or regenerated electric power, output from the motor generator MG2, and directly output the stepped-down electric power or regenerated electric power to the auxiliary 42. In the case of the hybrid vehicle, it is possible to charge the auxiliary battery 40 via the bidirectional DC-DC converter 41 with electric power generated by the driving force of the engine.

The current sensor 43 detects a current value of the auxiliary battery 40, and outputs the detected result to the controller 30. The voltage sensor 44 detects a voltage value of the auxiliary battery 40, and outputs the detected result to the controller 30.

When charging and discharging of the auxiliary battery 40 are controlled, a target SOC (a target value of the SOC) is set, and charging and discharging of the auxiliary battery 40 are controlled so that the SOC of the auxiliary battery 40 changes in accordance with the target SOC. Charge/discharge control over the auxiliary battery 40 is executed by the controller 30. The auxiliary battery 40 outputs electric power to the auxiliary and undergoes charge/discharge control for charging electric power generated by the motor generator MG1 that operates by using the power of the engine 27, and is charged or discharged for improving fuel economy (described later).

It is possible to estimate the SOC of the auxiliary battery 40 by using the detected results of the current sensor 43 and voltage sensor 44. As well as the method of estimating the SOC of the battery pack 10, a known method may be employed as needed as a method of estimating the SOC.

Next, charge/discharge control over the battery pack 10 according to the present embodiment will be described. When charging and discharging of the battery pack 10 are controlled, SWout, SWin are set. SWout is an allowable output power at or below which the battery pack 10 is allowed to be discharged. SWin is an allowable input power at or below which the battery pack 10 is allowed to be charged. As described above, a charge current is indicated by a negative value, so the allowable input power SWin is indicated by a negative value in contrast to the allowable output power SWout indicated by a positive value.

The controller 30 controls discharging of the battery pack 10 so that a discharge electric power of the battery pack 10 does not exceed the allowable output power SWout. The controller 30 also controls charging of the battery pack 10 so that a charge electric power of the battery pack 10 does not exceed the allowable input power SWin (does not exceed the allowable input power SWin in absolute value).

The allowable output power SWout and the allowable input power SWin may be, for example, set on the basis of the battery temperature Tb or SOC of the battery pack 10. When the correlation between the allowable output power SWout and at least one of the battery temperature Tb and the SOC is obtained in advance by an experiment, or the like, it is possible to calculate the allowable output power SWout by acquiring the battery temperature Tb or the SOC. Similarly, when the correlation between the allowable input power SWin and at least one of the battery temperature Tb and the SOC is obtained in advance by an experiment, or the like, it is possible to calculate the allowable input power SWin by acquiring the battery temperature Tb or the SOC.

The controller 30 executes charge/discharge control over the battery pack 10 so that the discharge electric power and the charge electric power respectively do not exceed the allowable output power SWout and the allowable input power SWin. In view of protection of the battery pack 10 (single cells 11), it is possible to execute charge/discharge control that further limits the allowable output power SWout and the allowable input power SWin.

For example, a bias of a salt concentration (ion concentration) occurs inside each of the single cells 11 on the basis of the current value at the time when the battery pack 10 (single cells 11) is discharged. This bias of the salt concentration is a bias of the salt concentration in the electrolytic solution of each single cell 11. Each single cell 11 is charged or discharged as a result of migration of ions between the positive electrode and negative electrode of the single cell 11. For example, when each single cell 11 is discharged at a high rate, a bias of the salt concentration occurs at a discharge side. This bias of the salt concentration increases the resistance value (internal resistance) of each single cell 11. Therefore, a bias of the salt concentration advances degradation of the single cell 11.

Such degradation (high-rate degradation) of each single cell 11 as a result of a bias of the salt concentration is allowed to be evaluated as follows. On the basis of the evaluated high-rate degradation, the allowable output power SWout is limited to a smaller value, and the allowable input power SWin is limited to a larger value (smaller value in absolute value). In this way, the battery is protected.

That is, the allowable output power SWout that is set on the basis of the battery temperature Tb and SOC of the battery pack 10 is set as a base electric power (upper limit value) of the battery pack 10, and a limited electric power Wout smaller than the allowable output power SWout is set on the basis of the high-rate degradation. The output of the battery pack 10 is controlled so as not to exceed the limited electric power Wout. A limited electric power Win smaller in absolute value than the allowable input power SWin is set on the basis of the high-rate degradation. The input of the battery pack 10 is controlled so as not to exceed the limited electric power Win.

High-rate degradation may be evaluated by using a damage amount D_dam_dc. The damage amount D_dam_dc may be calculated at predetermined intervals $\Delta t$ on the basis of the following mathematical expression (1). The damage amount D_dam_dc is calculated by the controller 30.

$$D\_dam\_dc[t + \Delta t] = \underbrace{D\_dam\_dc[t] - \alpha \times \Delta t \times D\_dam\_dc[t]}_{REDUCTION\,TERM} + \underbrace{\frac{\beta}{c0\_pow\_dc} \times Ib \times \Delta t}_{INCREASING\,TERM} \quad (1)$$

In the mathematical expression (1), t is a time, and D_dam_dc[t+$\Delta t$] is a currently calculated damage amount. D_dam_dc[t] is a previously calculated damage amount. As expressed by the mathematical expression (1), the current damage amount D_dam_dc[t+$\Delta t$] is calculated on the basis of the previous damage amount D_dam_dc[t]. A damage amount D_dam_dc[0] that is an initial value may be, for example, set to "0".

The second term on the right-hand side of the mathematical expression (1) is a term that reduces the damage amount D_dam_dc, and is a component at the time when a bias of the salt concentration decreases. The third term on the right-hand side of the mathematical expression (1) is a term that increases the damage amount D_dam_dc, and is a component at the time when a bias of the salt concentration increases. In this way, by calculating the current damage amount D_dam_dc in consideration of the reducing term and the increasing term, it is possible to cause the damage amount D_dam_dc to appropriately reflect a change (increase or decrease) in the bias of the salt concentration, which can be regarded as a factor of high-rate degradation. Thus, it is possible to acquire how each single cell 11 is close to occurrence of high-rate degradation on the basis of the damage amount D_dam_dc.

A bias of the salt concentration is reduced by diffusion of ions with a lapse of the time $\Delta t$. Therefore, in the mathematical expression (1), a forgetting factor $\alpha$ is set. The forgetting factor $\alpha$ is a factor that corresponds to the diffusion rate of ions in the electrolytic solution of each single cell 11. As the diffusion rate increases, the forgetting factor $\alpha$ increases. A product $\alpha \times \Delta t$ of $\alpha$ and $\Delta t$ is set within the range of "0" to "1". As the product $\alpha \times \Delta t$ of $\alpha$ and $\Delta t$ approaches "1", the term that reduces the damage amount D_dam_dc decreases. As the forgetting factor $\alpha$ increases or as the time $\Delta t$ extends, the product $\alpha \times \Delta t$ of $\alpha$ and $\Delta t$ approaches "1".

The forgetting factor $\alpha$ depends on the SOC or temperature Tb of each single cell 11. Therefore, it is possible to set the forgetting factor $\alpha$ on the basis of the SOC or the battery temperature Tb. Specifically, the correlation between the forgetting factor $\alpha$ and at least one of the SOC and the battery temperature Tb may be obtained in advance by an experiment, or the like. When the correlation among the forgetting factor $\alpha$, the SOC and the battery temperature Tb is obtained, the forgetting factor $\alpha$ may increase as the SOC of each single cell 11 increases, for example, where the battery temperature is the same. Where the SOC of each single cell 11 is the same, the forgetting factor $\alpha$ may increase as the battery temperature increases.

The correlation between the forgetting factor $\alpha$ and at least one of the SOC and the battery temperature Tb may be expressed as a map or a function. Information about the correlation may be stored in the memory 31. When the correlation is used, it is possible to set the forgetting factor $\alpha$ by acquiring the SOC or the battery temperature Tb.

In the mathematical expression (1), $\beta$ is a current factor. c0_pow_dc is a limit threshold. The current factor $\beta$ and the limit threshold c0_pow_dc depend on the SOC or temperature Tb of each single cell 11. Therefore, it is possible to set the current factor $\beta$ and the limit threshold c0_pow_dc on the basis of the SOC or the battery temperature Tb. Specifically, when the correlation (map or function) between the current factor $\beta$ and at least one of the SOC and the battery temperature Tb is obtained in advance by an experiment, or the like, it is possible to calculate the current factor $\beta$ by acquiring the SOC or the battery temperature Tb.

Similarly, when the correlation (map or function) between the limit threshold c0_pow_dc and at least one of the SOC and the battery temperature Tb is obtained in advance by an experiment, or the like, it is possible to calculate the limit threshold c0_pow_dc by acquiring the SOC or the battery temperature Tb. Information about the correlation for calculating the current factor $\beta$ or the limit threshold c0_pow_dc may be stored in the memory 31. When the correlation among the limit threshold c0_pow_dc, the SOC and the battery temperature Tb is obtained, the limit threshold c0_pow_dc may increase as the SOC of each single cell 11 increases, for example, where the battery temperature Tb is the same. Where the SOC of each single cell 11 is the same, the limit threshold c0_pow_dc may increase as the battery temperature Tb increases.

Ib shown in the mathematical expression (1) is a current value flowing through each single cell 11. The value detected by the current sensor 22 is used as the current value Ib. When the battery pack 10 is discharged, the current value Ib is a positive value. When the battery pack 10 is charged, the current value Ib is a negative value. Thus, as the current value Ib increases or as the time $\Delta t$ extends, the third term (increasing term) on the right-hand side of the mathematical expression (1) increases.

When the state of advance of high-rate degradation is acquired, an accumulated value Dam_dc of the damage amount D_dam_dc (damage accumulated amount) is used. The damage accumulated amount Dam_dc may be calculated on the basis of the following mathematical expression (2).

$$\text{Dam\_dc}[t+\Delta t] = \gamma\_dc \times \text{Dam\_dc}[t] + \eta \times D\_dam\_dc \qquad (2)$$

In the mathematical expression (2), Dam_dc[t+Δt] is a current damage accumulated amount. Dam_dc[t] is a previous damage accumulated amount. As expressed by the mathematical expression (2), the current damage accumulated amount Dam_dc[t+Δt] is calculated in consideration of the previous damage accumulated amount Dam_dc[t].

γ_dc shown in the mathematical expression (2) is an attenuation coefficient and is a value smaller than "1". A bias of the salt concentration is reduced by diffusion of ions with a lapse of time. Therefore, when the current damage accumulated amount Dam_dc is calculated, the previous damage accumulated amount Dam_dc may decrease. In consideration of this point, the attenuation coefficient γ_dc is set. The attenuation coefficient γ_dc may be set in advance. Information about the attenuation coefficient γ_dc may be stored in the memory 31.

η shown in the mathematical expression (2) is a correction coefficient. The correction coefficient η may be set as needed. Information about the correction coefficient η may be stored in the memory 31. D_dam_dc shown in the mathematical expression (2) is the current damage amount calculated by the mathematical expression (1). In the present embodiment, the damage amount D_dam_dc is calculated at the predetermined intervals Δt, and the damage accumulated amount Dam_dc is calculated by using only the damage amount D_dam_dc that satisfies a predetermined condition.

Specifically, a reference amount (accumulation threshold) D_dam_th for the damage amount D_dam_dc is set. By using the damage amount D_dam_dc larger than or equal to the set reference amount D_dam_th, the damage accumulated amount Dam_dc is calculated. The reference amount D_dam_th is used to specify the damage amount D_dam_dc at which high-rate degradation is easy to be influenced. In consideration of this point, it is possible to set the reference amount D_dam_th as needed. Information about the reference amount D_dam_th may be stored in the memory 31. It is also possible to calculate the damage accumulated amount Dam_dc by using all the calculated damage amounts D_dam_dc.

The damage amount D_dam_dc for evaluating high-rate degradation indicates a bias of the salt concentration due to a charge/discharge current, and the positive/negative sign of current value is opposite between discharging and charging. Thus, in discharging at a high rate, the damage amount D_dam_dc is a positive value, and the damage accumulated amount Dam_dc increases in the positive direction. On the other hand, in charging at a high rate, the damage amount D_dam_dc is a negative value, and the damage accumulated amount Dam_dc increases in the negative direction.

That is, the damage amount D_dam_dc and the damage accumulated amount Dam_dc are evaluation values for evaluating a degradation component that reduces the output performance of the battery pack 10 as a result of a bias of the salt concentration in the electrolyte due to discharging of the battery pack 10. These values are calculated on the basis of the current value during charging and discharging of the battery pack 10. Therefore, by setting a discharge-side threshold Dam_th1 for the damage accumulated amount Dam_dc due to discharging at a high rate, the output is limited by further reducing the allowable output power SWout of the battery pack 10 when the damage accumulated amount Dam_dc exceeds the threshold Dam_th1, so it is possible to protect the battery.

On the other hand, the damage amount D_dam_dc and the damage accumulated amount Dam_dc are also evaluation values (second target values) for evaluating a degradation component that reduces the input performance of the battery pack 10 as a result of a bias of the salt concentration in the electrolyte due to charging of the battery pack 10. These values are calculated on the basis of the current value during charging and discharging of the battery pack 10. Therefore, by setting a charge-side threshold Dam_th2 for the damage accumulated amount Dam_dc due to charging at a high rate, the input is limited by reducing the allowable input power SWin of the battery pack 10 when the damage accumulated amount Dam_dc exceeds the threshold Dam_th2, so it is possible to protect the battery.

As described above, the damage amount D_dam_dc resulting from discharging at a high rate increases the damage accumulated amount Dam_dc. The damage amount D_dam_dc resulting from charging at a high rate reduces the damage accumulated amount Dam_dc. That is, it appears that a bias of the salt concentration resulting from discharging (charging) of each single cell 11 is reduced by charging (discharging) each single cell 11.

Thus, a biased state of the salt concentration resulting from discharging and a biased state of the salt concentration resulting from charging are opposite states. Therefore, by developing a bias of the salt concentration resulting from charging, it is possible to reduce a bias of the salt concentration resulting from discharging. Conversely, by developing a bias of the salt concentration resulting from discharging, it is possible to reduce a bias of the salt concentration resulting from charging.

Each of the thresholds Dam_th1, Dam_th2 is set in advance in view of suppressing an increase in the resistance of each single cell 11 resulting from a bias of the salt concentration during charging or discharging. The discharge-side and charge-side thresholds Dam_th1, Dam_th2 may be set as needed. These values may be stored in the memory 31.

The controller 30 calculates the damage amount D_dam_dc and the damage accumulated amount Dam_dc for evaluating high-rate degradation. When the calculated damage accumulated amount Dam_dc is larger than the predetermined threshold Dam_th1 or the predetermined threshold Dam_th2, the controller 30 determines that it is required to suppress an increase in the resistance of each single cell 11. The controller 30, for example, sets the limited electric power Wout on the basis of the damage accumulated amount Dam_dc, and limits the output of the battery pack 10 so that the output of the battery pack 10 does not exceed the limited electric power Wout. The limited electric power Wout is smaller than the allowable output power SWout that is set on the basis of the battery temperature Tb and SOC of the battery pack 10.

Specifically, when the correlation (map or function) between the damage accumulated amount Dam_dc and the limited electric power Wout is obtained in advance by an experiment, or the like, it is possible to calculate the limited electric power Wout by calculating the damage accumulated amount Dam_dc. For example, the correlation of the limited electric power Wout with a difference between the damage accumulated amount Dam_dc and the threshold Dam_th1 is obtained in advance, and the limited electric power Wout may be set so as to decrease (the limited amount increases)

as the difference increases. Information about the correlation between the damage accumulated amount Dam_dc and the limited electric power Wout may be stored in the memory 31.

Similarly, the charge-side threshold Dam_th2 is set in advance in view of suppressing an increase in the resistance of each single cell 11 resulting from a bias of the salt concentration during charging. When the damage accumulated amount Dam_dc is larger than the charge-side threshold Dam_th2, the controller 30 determines that it is required to suppress an increase in the resistance of each single cell 11, and the limited electric power Win is set on the basis of the damage accumulated amount Dam_dc. For example, the correlation of the limited electric power Win with a difference between the damage accumulated amount Dam_dc and the charge-side threshold Dam_th2 is obtained in advance, and the limited electric power Win may be set so as to decrease (the limited amount increases) as the difference increases. The correlation (map or function) between the damage accumulated amount Dam_dc and the limited electric power Win may also be obtained in advance by an experiment, or the like. Information about the correlation (map or function) between the damage accumulated amount Dam_dc and the limited electric power Win may also be stored in the memory 31.

In view of battery protection for suppressing high-rate degradation in this way, the allowable output power SWout and the allowable input power SWin are limited. At this time, the battery pack 10 is discharged at the limited electric power Wout based on the damage accumulated amount Dam_dc smaller than the allowable output power SWout, so it is possible to protect the battery. On the other hand, the output of the battery is insufficient for a vehicle request. Therefore, the vehicle request is not satisfied, for example, it is not possible to exercise power performance that matches with the vehicle request, so drivability decreases, and, the amount of battery output insufficient for the vehicle request is compensated by the power of the engine 27, so fuel economy deteriorates. When the battery pack 10 is charged at the limited electric power Win, the input of the battery pack 10 is insufficient for a regenerated electric power, so it is not possible to store part of the regenerated electric power in the battery pack 10. Therefore, energy efficiency decreases, with the result that fuel economy deteriorates.

In the present embodiment, in charge/discharge control over the battery pack 10 at the limited electric power Win or limited electric power Wout limited on the basis of high-rate degradation, the auxiliary battery 40 and the bidirectional DC-DC converter 41 are controlled so that the amount of electric power insufficient for a required vehicle output is supplied from the auxiliary battery 40 and a redundant amount of regenerated electric power, which is not entirely charged into the battery pack 10 (part of regenerated electric power, which is not entirely charged into the battery pack 10), is charged into the auxiliary battery 40. In this way, even when the input/output of the battery pack 10 is limited in view of battery protection, supply of electric power that satisfies a vehicle request is kept (a decrease in drivability is suppressed by keeping supply of electric power that satisfies a vehicle request, or fuel economy is improved by reducing opportunities for compensating for the amount of battery output insufficient for the vehicle request with the power of the engine 27), and fuel economy is improved by suppressing a decrease in energy efficiency.

Figure 2:
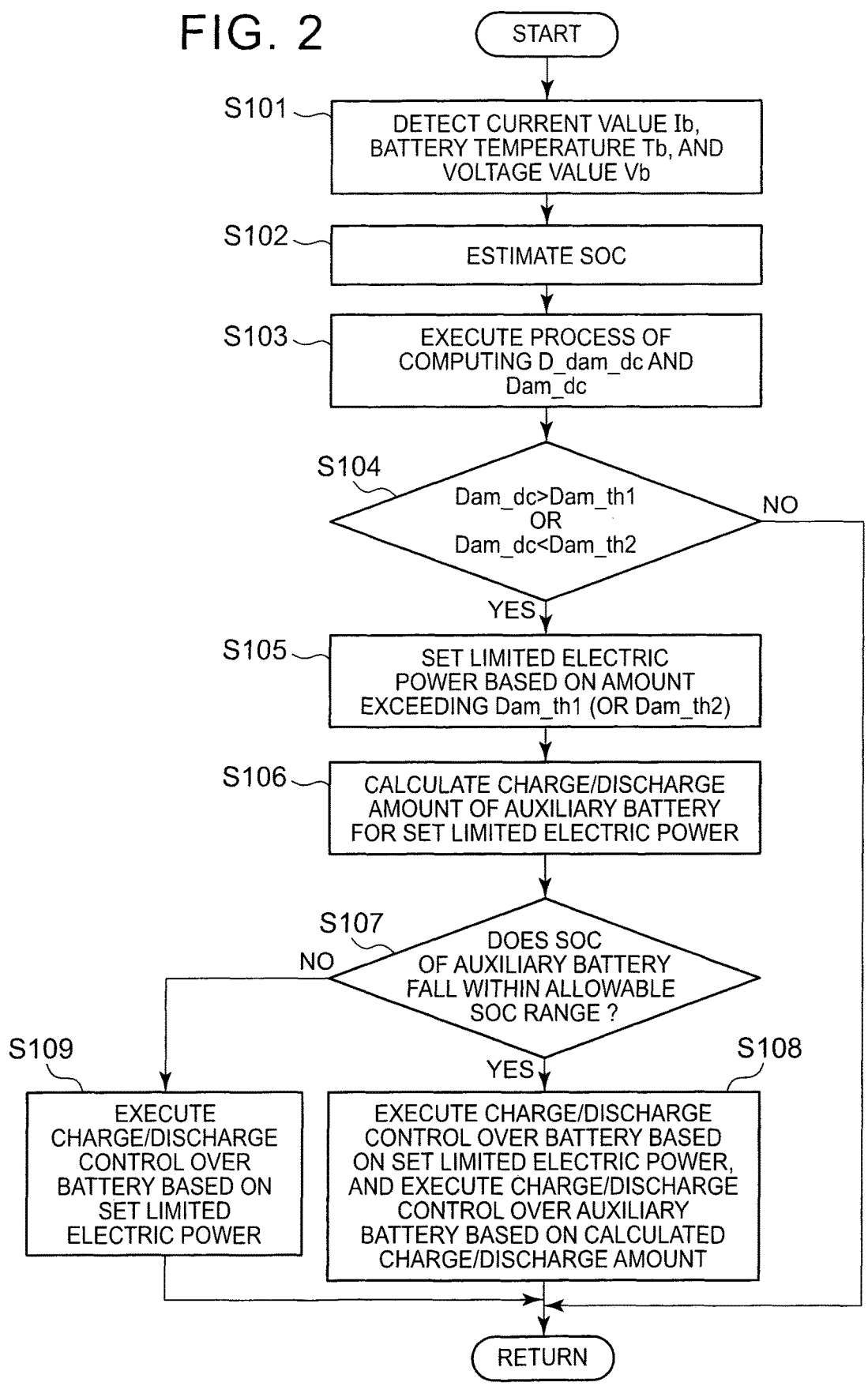
FIG. 2 is a view that shows a processing flowchart of input/output limitations on a battery pack and charge/discharge control over an auxiliary battery in response to high-rate degradation in the first embodiment.

FIG. 2 is a view that shows a processing flowchart of input/output limitations on the battery pack 10 in response to high-rate degradation according to the present embodiment.

As shown in FIG. 2, in charge/discharge control over the battery pack 10 after an ignition switch is turned on, the controller 30 executes the process of estimating the SOC of the battery pack 10 by using the current value Ib, battery temperature Tb and voltage value Vb of the battery pack 10, detected from the sensors, and executes the process of calculating the damage amount D_dam_dc and the damage accumulated amount Dam_dc for evaluating high-rate degradation (S101 to S103).

Initially, the output limitation on the battery pack 10 and the output process of the auxiliary battery 40 will be described. The controller 30 determines whether the damage accumulated amount Dam_dc exceeds the discharge-side threshold Dam_th1 (S104). When it is determined that the damage accumulated amount Dam_dc is larger than the discharge-side threshold Dam_th1, the controller 30 sets the limited electric power Wout on the basis of the difference between the damage accumulated amount Dam_dc and the threshold Dam_th1 (S105). The controller 30 calculates the difference between the allowable output power SWout and the limited electric power Wout, that is, the limited amount of the allowable output power of the battery pack 10 (S106). The limited amount of the allowable output power is an upper limit value of the amount of discharge electric power that is compensated by the auxiliary battery 40.

When the controller 30 determines in step S104 that the damage accumulated amount Dam_dc does not exceed the discharge-side threshold Dam_th1 or the charge-side threshold Dam_th2, the controller 30 sets the upper limit values to the allowable output power SWout and the allowable input power SWin that are set on the basis of the battery temperature Tb or SOC of the battery pack 10, and executes charge/discharge control so that the discharge electric power and the charge electric power respectively do not exceed the allowable output power SWout and the allowable input power SWin.

The controller 30 determines whether the SOC of the auxiliary battery 40 falls within a preset allowable SOC range (S107). For example, when the SOC is lower than the allowable SOC range, the controller 30 executes control so that no electric power is output from (compensated by) the auxiliary battery 40 in order to prevent overdischarging of the auxiliary battery 40 (NO in S107). That is, the controller 30 executes only discharge control over the battery pack 10 with the upper limit set to the limited electric power Wout on a required vehicle output (S109).

On the other hand, when the controller 30 determines in step S107 that the SOC of the auxiliary battery 40 falls within the preset allowable SOC range, the controller 30 executes discharge control with the upper limit set to the limited electric power Wout on the required vehicle output, and controls the bidirectional DC-DC converter 41 (S108). The bidirectional DC-DC converter 41 is controlled so as to discharge an insufficient amount of electric power from the auxiliary battery 40 to the inverter 24 with the upper limit value set to a limited amount that is the difference between the allowable output power SWout and the limited electric power Wout. The insufficient amount of electric power results from setting the limited electric power Wout on the required vehicle output.

Figure 3:
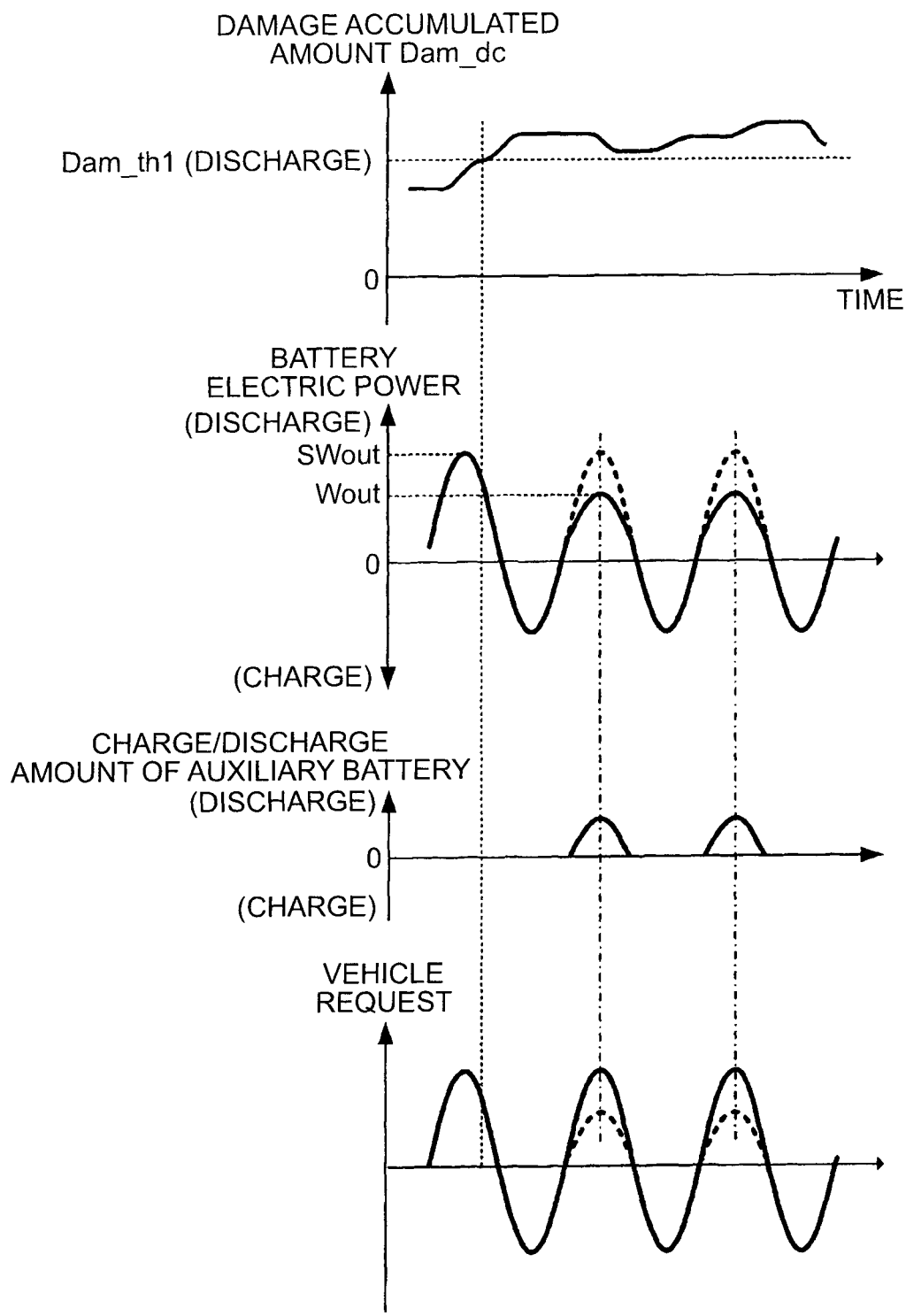
FIG. 3 is a time chart that shows the correlation of a charge/discharge amount of the auxiliary battery and a vehicle request in response to an output limitation on the battery pack in the first embodiment.

FIG. 3 is a time chart that shows the correlation of a discharge amount of the auxiliary battery 40 and a vehicle request in response to an output limitation on the battery pack 10. As shown in FIG. 3, after the damage accumulated amount Dam_dc exceeds the discharge-side threshold Dam_th1, discharge control is executed with the upper limit set to the limited electric power Wout, so electric power becomes insufficient for a vehicle request (the continuous line in the graph showing the battery electric power in FIG. 3). However, the insufficient amount of electric power is compensated by discharging the auxiliary battery 40 (the continuous line in the graph showing the charge/discharge amount of the auxiliary battery 40 in FIG. 3), so the required vehicle output is satisfied. In the graph showing a vehicle request in FIG. 3, the output electric power of the auxiliary battery 40 is added to the battery output indicated by the dashed line. Therefore, a vehicle output indicated by the continuous line does not decrease, and, for example, a decrease in drivability is suppressed.

On the other hand, the input limitation on the battery pack 10 and the input process of the auxiliary battery 40 will be described below. In the example shown in FIG. 2, the controller 30 determines whether the damage accumulated amount Dam_dc exceeds the charge-side threshold Dam_th2 (S104). When the damage accumulated amount Dam_dc is smaller (larger in absolute value) than the charge-side threshold Dam_th2, the controller 30 sets the limited electric power Win on the basis of the difference between the damage accumulated amount Dam_dc and the threshold Dam_th2 (S105). The difference between the allowable input power SWin and the limited electric power Win (the limited amount of the allowable input power) is calculated (S106). The limited amount of the allowable input power is an upper limit value of the amount of charge electric power that is charged into the auxiliary battery 40.

The controller 30 determines whether the SOC of the auxiliary battery 40 falls within the preset allowable SOC range (S107). For example, when the SOC is higher than the allowable SOC range, the controller 30 executes control so that regenerated electric power is not charged into the auxiliary battery 40 in order to prevent overcharging of the auxiliary battery 40 (NO in S107). That is, the controller 30 executes only charge control over the battery pack 10 with the upper limit set to the limited electric power Win on regenerated electric power (S109).

On the other hand, when the controller 30 determines in step S107 that the SOC of the auxiliary battery 40 falls within the preset allowable SOC range, the controller 30 executes charge control over the battery pack 10 with the upper limit set to the limited electric power Win on the regenerated electric power, and controls the bidirectional DC-DC converter 41 (S108). The bidirectional DC-DC converter 41 is controlled so as to charge the auxiliary battery 40 with a non-chargeable redundant amount of electric power (part of regenerated electric power) with the upper limit value set to the limited amount that is the difference between the allowable input power SWin and the limited electric power Win. The non-chargeable redundant amount of electric power results from setting the limited electric power Win on the regenerated electric power.

Figure 4:
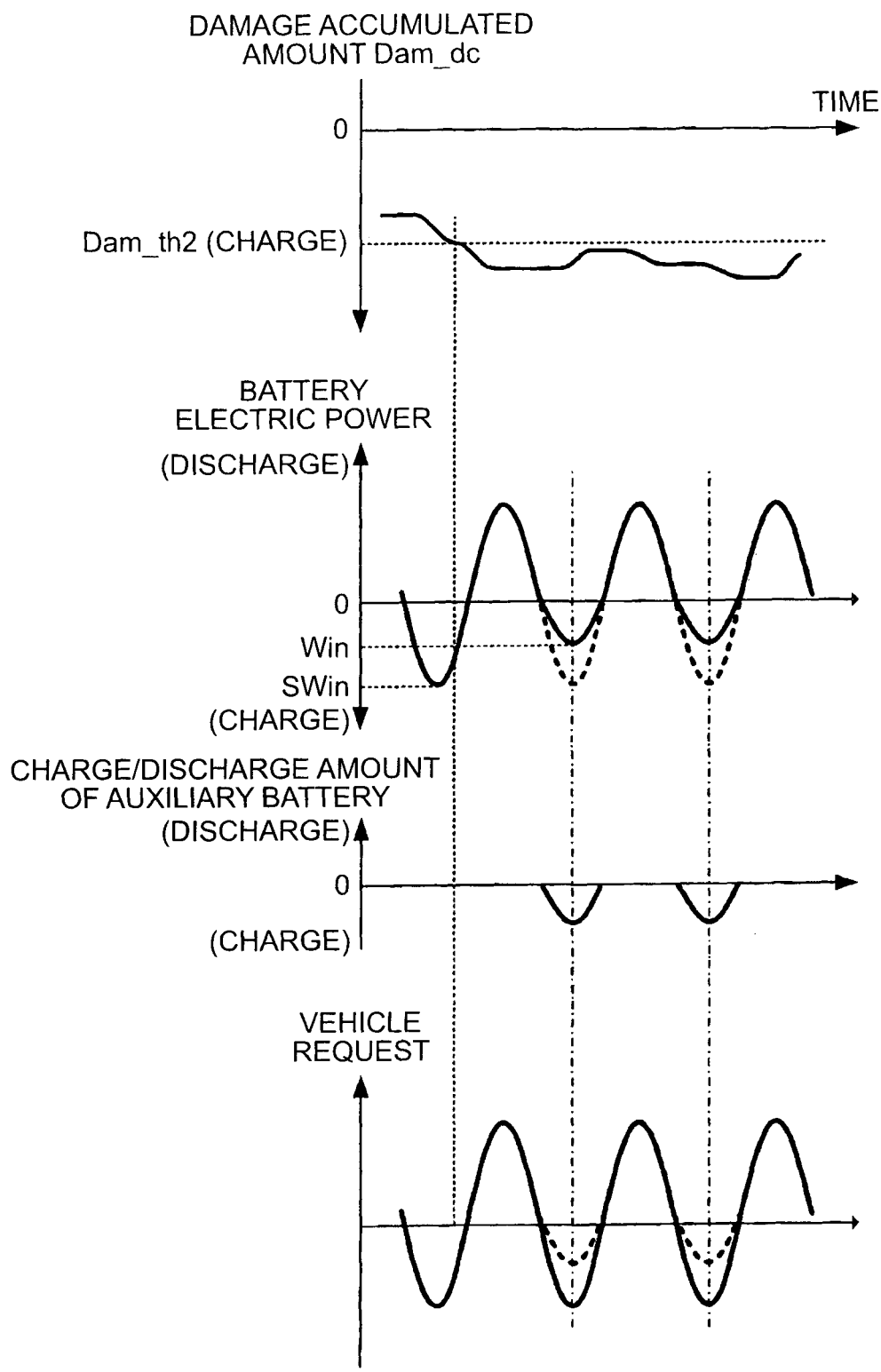
FIG. 4 is a time chart that shows the correlation of a charge/discharge amount of the auxiliary battery and a vehicle request in response to an input limitation on the battery pack in the first embodiment.

FIG. 4 is a time chart that shows the correlation of a charge/discharge amount of the auxiliary battery 40 and a vehicle input/output in response to an input limitation on the battery pack 10. As shown in FIG. 4, after the damage accumulated amount Dam_dc exceeds the charge-side threshold Dam_th2, charge control is executed with the upper limit set to the limited electric power Win, so a redundant amount of regenerated electric power, which is not entirely charged, arises for a vehicle request (the continuous line in the graph showing the battery electric power in FIG. 4). However, the redundant amount of regenerated electric power is charged into the auxiliary battery 40 (the continuous line in the graph showing the charge/discharge amount of the auxiliary battery 40 in FIG. 4), so the required vehicle output is satisfied. In the graph showing the vehicle request in FIG. 4, the auxiliary battery 40 charges a redundant amount of regenerated electric power that is not entirely charged into the battery pack 10 for the battery input (limited allowable input power) indicated by the dashed line. Therefore, it is possible to improve fuel economy by suppressing a decrease in energy efficiency.

In this way, even when the input or output of the battery pack 10 is limited in view of battery protection, it is possible to suppress a decrease in drivability during vehicle traveling by causing the vehicle to travel by using the output of the battery pack 10 and the output of the auxiliary battery 40, and to improve fuel economy by reducing opportunities for compensating for the amount of battery output insufficient for the vehicle request with the power of the engine 27. During braking of the vehicle, it is possible to efficiently store regenerated electric power in the battery pack 10 and the auxiliary battery 40, so it is possible to suppress deterioration of fuel economy.

Next, charge/discharge control over the auxiliary battery 40 will be described. As described above, the target SOC (the target value of the SOC) of the auxiliary battery 40 is set, and charging and discharging of the auxiliary battery 40 are controlled so that the SOC of the auxiliary battery 40 changes in accordance with the target SOC. However, if an insufficient amount of output power or a charge amount for charging a redundant amount of regenerated electric power is not ensured for input/output limitations on the battery pack 10, it is not possible to suppress a decrease in drivability during traveling or efficiently store regenerated electric power.

Figure 5:
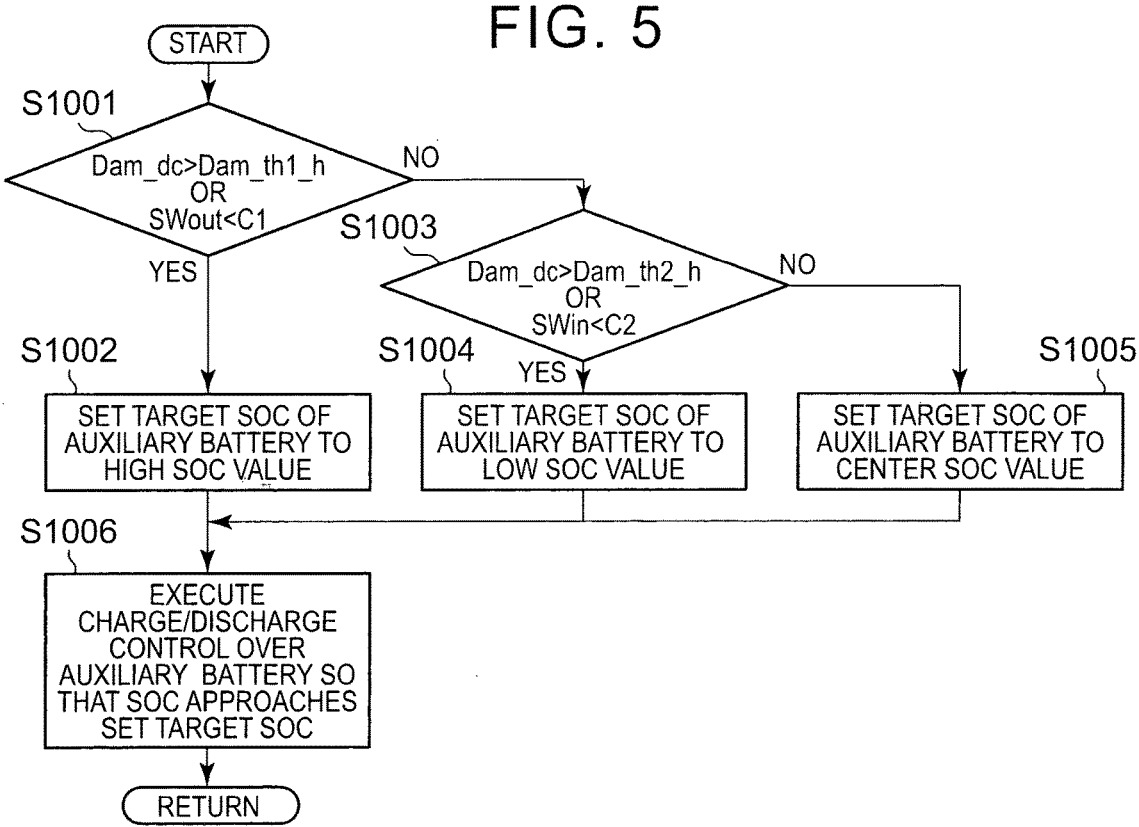
FIG. 5 is a view that shows a processing flowchart of SOC control over the auxiliary battery in the first embodiment.
Figure 6:
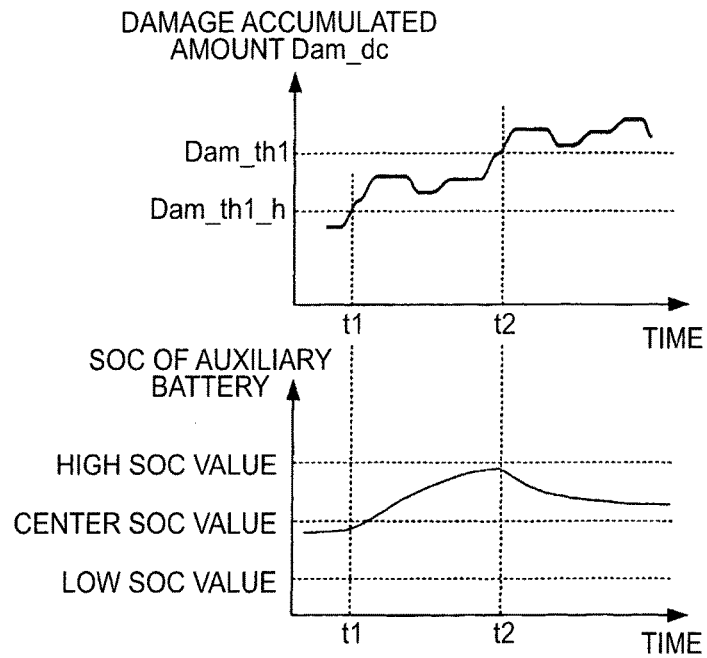
FIG. 6 is a time chart for illustrating the correlation of a target SOC of the auxiliary battery based on high-rate degradation in the first embodiment.

Therefore, in the present embodiment, the SOC of the auxiliary battery 40 is controlled on the basis of high-rate degradation of the battery pack 10. FIG. 5 is a view that shows a processing flowchart of control over the SOC of the auxiliary battery 40 according to the present embodiment. FIG. 6 is a time chart that shows changes in the damage accumulated amount Dam_dc and the SOC of the auxiliary battery 40.

As shown in FIG. 5 and FIG. 6, for example, a threshold Dam_th1_$h$ smaller than the damage accumulated amount Dam_dc at which the output limitation is imposed on the battery pack 10 is set in advance. The threshold Dam_th1_$h$ is a reference value for acquiring a state where the salt concentration is biased to the discharge side in the battery pack 10 (single cells 11) before the output limitation is imposed.

The controller 30 determines whether the damage accumulated amount Dam_dc exceeds the threshold Dam_th1_$h$ (S1001). When the damage accumulated amount Dam_dc exceeds the threshold Dam_th1_$h$, the controller 30 sets the target SOC of the auxiliary battery 40 to a high SOC value (S1002). The controller 30 controls charging and discharging of the auxiliary battery 40 so that the SOC of the auxiliary battery 40 changes in accordance with the high SOC value (S1006).

That is, by setting the threshold Dam_th1_$h$ in advance, it is possible to acquire the tendency that the allowable output power of the battery pack 10 is limited before the output limitation based on high-rate degradation. The threshold Dam_th1_$h$ is smaller by a predetermined value than the threshold Dam_th1 at which the allowable output power SWout is limited to a smaller value. As shown in FIG. 6, at time t1 at which the damage accumulated amount Dam_dc exceeds the threshold Dam_th1_$h$, the controller 30 sets the target SOC of the auxiliary battery 40 to the high SOC value, and executes charge/discharge control so that the SOC increases. The SOC of the auxiliary battery 40 gradually increases from time t1.

At time t2 at which the damage accumulated amount Dam_dc exceeds the threshold Dam_th1, charge/discharge control is changed from the process of controlling the SOC so that the SOC approaches the target SOC to a charge/discharge process that allows discharging to an SOC lower limit value (for example, a low SOC value), and the bidirectional DC-DC converter 41 is controlled. The bidirectional DC-DC converter 41 is controlled so as to discharge an insufficient amount of electric power from the auxiliary battery 40 by setting the limited electric power Wout on the required vehicle output. With this configuration, it is possible to ensure an insufficient amount of output electric power in advance for the output limitation imposed on the battery pack 10, so it is possible to extend the duration of suppression of a decrease in drivability during traveling.

The example in which the target SOC of the auxiliary battery 40 is set to the high SOC value and then the SOC of the auxiliary battery 40 increases is described above. For example, when the SOC of the auxiliary battery 40 is close to the high SOC value at time t1, the controller 30 executes charge/discharge control so that the output of the auxiliary battery 40 is limited but the SOC does not decrease.

As shown in FIG. 5, a threshold Dam_th2_$h$ smaller than the threshold Dam_th2 of the damage accumulated amount Dam_dc at which the input limitation is imposed on the battery pack 10 is set in advance. The threshold Dam_th2_$h$ is a reference value for acquiring a state where the salt concentration is biased to the charge side in the battery pack 10 (single cells 11) before the input limitation is imposed.

The controller 30 determines whether the damage accumulated amount Dam_dc exceeds the threshold Dam_th2_$h$ (is larger than the threshold Dam_th2_$h$ in absolute value) (S1003). When the damage accumulated amount Dam_dc exceeds the threshold Dam_th2_$h$, the controller 30 sets the target SOC of the auxiliary battery 40 to the low SOC value (S1004). The controller 30 controls charging and discharging of the auxiliary battery 40 so that the SOC of the auxiliary battery 40 changes in accordance with the low SOC value (S1006).

In this way, by setting the threshold Dam_th2_$h$ in advance, it is possible to acquire the tendency that the allowable input power of the battery pack 10 is limited before the input limitation based on high-rate degradation. The threshold Dam_th_2_h is smaller by a predetermined value than the threshold Dam_th2 at which the allowable input power SWin is limited to a smaller value. At the timing at which the damage accumulated amount Dam_dc exceeds the threshold Dam_th2_$h$, the controller 30 sets the target SOC of the auxiliary battery 40 to the low SOC value, and executes charge/discharge control so that the SOC decreases.

At the timing at which the damage accumulated amount Dam_dc exceeds the threshold Dam_th2, the controller 30 changes charge/discharge control from the process of controlling the SOC so that the SOC approaches the target SOC to a charge/discharge process that allows charging to an SOC upper limit value (for example, the high SOC value), and controls the bidirectional DC-DC converter 41. The bidirectional DC-DC converter 41 is controlled so as to charge a redundant amount of not-entirely-charged electric power into the auxiliary battery 40 by setting the limited electric power Win on the regenerated electric power. With this configuration, it is possible to ensure a reserved capacity in advance for a redundant amount of regenerated electric power that is not entirely charged into the battery pack 10 for the input limitation on the battery pack 10, so it is possible to increase opportunities for (extend the duration of) storing regenerated electric power.

When the damage accumulated amount Dam_dc does not exceed the threshold Dam_th1_$h$ or the threshold Dam_th2_$h$ (NO in S1003), the controller 30 sets the target SOC of the auxiliary battery 40 to a center SOC value, and executes charge/discharge control so that the target SOC of the auxiliary battery 40 approaches the center SOC value (S1006). The high SOC value, low SOC value and center SOC value of the auxiliary battery 40 may be set as needed such that High SOC value>Center SOC value>Low SOC value.

In order to ensure an insufficient amount of output power or a charge amount for charging a redundant amount of regenerated electric power for input/output limitations on the battery pack 10, it is possible to control the SOC of the auxiliary battery 40 on the basis of the allowable output power SWout and the allowable input power SWin.

As described above, the allowable output power SWout and the allowable input power SWin are set on the basis of the battery temperature Tb and SOC of the battery pack 10. This is based on the fact that degradation is accelerated when the battery pack 10 has a high temperature, the internal resistance increases when the battery pack 10 has a low temperature, and a decrease in charging efficiency, generation of heat due to heat of reaction resulting from the decrease in charging efficiency, and the like, occur when the SOC of the battery pack 10 increases.

Therefore, the allowable output power SWout and the allowable input power SWin are set to smaller values in a region in which the battery temperature Tb is high and a region in which the battery temperature Tb is low. In a state where the SOC of the battery pack 10 is low, the allowable output power SWout is set to a small value; whereas, in a state where the SOC of the battery pack 10 is high, the allowable input power SWin is set to a small value.

That is, the allowable output power SWout and the allowable input power SWin are also limited in view of battery protection based on the battery temperature Tb and SOC of the battery pack 10. Therefore, the output of the battery becomes insufficient for the vehicle request, and the input of the battery becomes insufficient for the regenerated electric power.

In the present embodiment, even when the allowable output power SWout and the allowable input power SWin are reduced (limited) on the basis of the battery temperature Tb and SOC of the battery pack 10 other than limitations on the allowable output power SWout and the allowable input power SWin due to high-rate degradation, it is possible to control the bidirectional DC-DC converter 41 so that an insufficient amount of electric power for the required vehicle output is compensated from the auxiliary battery 40 and a redundant amount of regenerated electric power that is not entirely charged into the battery pack 10 is charged into the auxiliary battery 40.

In this case, as shown in FIG. 5, in preparation for further limitations on the allowable output power SWout and the allowable input power SWin or limitations for high-rate degradation, it is possible to control the SOC (charge/discharge control) by setting the target SOC of the auxiliary battery 40. The SOC control is executed at the initial stage in which each of the allowable output power SWout and the allowable input power SWin of the battery pack 10 begins to be limited on the basis of the battery temperature Tb and SOC of the battery pack 10.

Specifically, in the example shown in FIG. 5, when the allowable output power SWout of the battery pack 10 is limited to a value across a predetermined threshold C1 on the basis of the battery temperature Tb and SOC of the battery pack 10, in other words, when the allowable output power SWout is limited to a value smaller than the predetermined threshold C1 (S1001), the controller 30 sets the target SOC of the auxiliary battery 40 to the high SOC value (S1002), and executes charge/discharge control over the SOC of the auxiliary battery 40 (S1006).

Similarly, when the allowable input power SWin of the battery pack 10 is limited to a value larger than a predetermined threshold C2 on the basis of the battery temperature Tb and SOC of the battery pack 10 (S1003), the controller 30 sets the target SOC of the auxiliary battery 40 to the low SOC value (S1004), and executes charge/discharge control over the SOC of the auxiliary battery 40 (S1006). When each of the allowable output power SWout and the allowable input power SWin does not exceed a corresponding one of the thresholds C1, C2 (No in S1003), the controller 30 sets the target SOC of the auxiliary battery 40 to the center SOC value, and controls the SOC of the auxiliary battery 40 (S1006).

A second embodiment will be described. FIG. 7 to FIG. 11 are views that show the second embodiment. The present embodiment differs from the first embodiment in that high-rate degradation eliminating control and high-rate degradation suppressing control are executed by using charge/discharge electric powers of the auxiliary battery 40 before the allowable output power SWout and allowable input power SWin of the battery pack 10 are limited on the basis of high-rate degradation.

As described above, discharge-side high-rate degradation (a bias of the salt concentration resulting from discharging of each single cell 11) is eliminated by charging each single cell 11. Conversely, charge-side high-rate degradation (a bias of the salt concentration resulting from charging of each single cell 11) is eliminated by discharging each single cell 11.

In the present embodiment, when the damage accumulated amount Dam_dc has an increasing tendency, the damage accumulated amount Dam_dc is reduced by the damage amount D_dam_dc resulting from charging. When the damage accumulated amount Dam_dc has a decreasing tendency, the damage accumulated amount Dam_dc is increased by the damage amount D_dam_dc resulting from discharging. In this way, charge/discharge control over the auxiliary battery 40 is executed so as to eliminate high-rate degradation.

In order not to eliminate high-rate degradation (reduce the damage accumulated amount Dam_dc in absolute value) but to suppress high-rate degradation (reduce the rate of increase or rate of decrease in the damage accumulated amount Dam_dc), the allowable output power SWout and allowable input power SWin of the battery pack 10 are limited, and an electric power (or a charge amount) required for a vehicle request is compensated by input/output control over the auxiliary battery 40.

Figure 7:
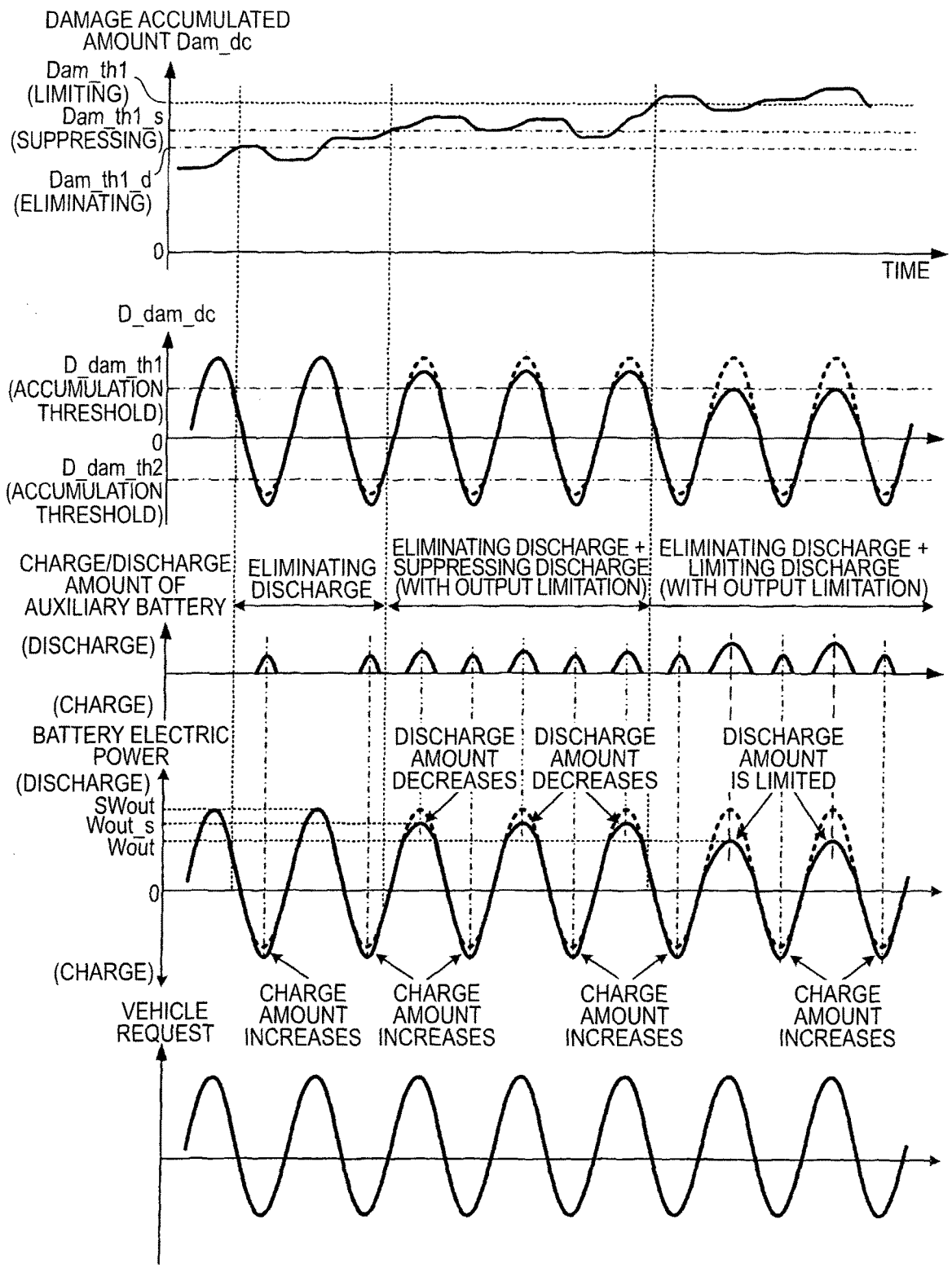
FIG. 7 is a time chart that shows the correlation of an eliminating process, suppressing process and limiting process of the battery pack, a charge/discharge amount of the auxiliary battery and a vehicle request with respect to high-rate degradation in a second embodiment.

FIG. 7 is a time chart that shows the correlation of a discharge amount of the auxiliary battery 40 and vehicle input/output in response to charge/discharge control over the battery pack 10, including high-rate eliminating process, high-rate suppressing process and high-rate limiting process according to the present embodiment. The high-rate limiting process corresponds to discharge control with the upper limit set to the limited electric power Wout after the damage accumulated amount Dam_dc exceeds the discharge-side threshold Dam_th1 as described in the first embodiment.

As shown in FIG. 7, a high-rate suppressing threshold Dam_th1_s smaller than the threshold Dam_th1 and a high-rate eliminating threshold Dam_th1_d smaller than the threshold Dam_th1_s are set in advance for the threshold Dam_th1 at which the allowable output power SWout and the allowable input power SWin are limited.

In the present embodiment, for an increasing tendency of the damage accumulated amount Dam_dc, the high-rate eliminating process, the high-rate suppressing process and the high-rate limiting process are started stepwisely. Initially, at the timing at which the damage accumulated amount Dam_dc exceeds the high-rate eliminating threshold Dam_th1_d, the high-rate eliminating process is executed to reduce the damage accumulated amount Dam_dc.

In the high-rate eliminating process, in charging and discharging of the battery pack 10 in a direction to reduce the damage accumulated amount Dam_dc, the input and output of the auxiliary battery 40 are controlled so as to further increase the amount of reduction in the damage accumulated amount Dam_dc. For example, as shown in the example of FIG. 7, when the damage accumulated amount Dam_dc has an increasing tendency because of discharge-side high-rate degradation, the negative damage amount D_dam_dc resulting from charging is added to the positive damage accumulated amount Dam_dc by charging the battery pack 10. Therefore, it is possible to reduce the damage accumulated amount Dam_dc.

At this time, the controller 30 executes charge control over the battery pack 10 so that the charge amount that is charged into the battery pack 10 is increased by discharging charge electric power from the auxiliary battery 40 to the battery pack 10. In FIG. 7, the damage amount D_dam_dc has a larger amount exceeding the reference value (accumulation threshold) D_dam_th2 when charge electric power is supplied from the auxiliary battery 40 to the battery pack 10 (continuous line) than when no charge electric power is supplied from the auxiliary battery 40 to the battery pack 10 (dashed line), and the negative damage amount D_dam_dc that is added to the damage accumulated amount Dam_dc is increased.

This also applies to the case where the damage accumulated amount Dam_dc has a decreasing tendency because of charge-side high-rate degradation. The controller 30 executes discharge control over the battery pack 10 so that discharge electric power for charging the auxiliary battery 40 is further output in addition to discharge electric power to the inverter 24, and the like. By executing control so that the discharge amount that is discharged from the battery pack 10 increases, an amount exceeding the reference value (accumulation threshold) D_dam_th1 increases, so it is possible to increase the positive damage amount D_dam_dc that is added to the damage accumulated amount Dam_dc.

The discharge amount of the auxiliary battery 40 (the amount of electric power that is charged into the battery pack 10) in the high-rate eliminating process may be, for example, set as follows. The correlation of the discharge amount of the auxiliary battery 40 with the difference between the damage accumulated amount Dam_dc and the threshold Dam_th1_d is obtained in advance, and the discharge amount of the auxiliary battery 40 increases as the difference increases. The charge amount that is charged into the auxiliary battery 40 may also be similarly set for discharge control over the battery pack 10. Information about the correlation between the damage accumulated amount Dam_dc and each of the discharge amount and charge amount of the auxiliary battery 40 may be stored in the memory 31.

Next, the high-rate suppressing process is the process of limiting the input and output of the battery pack 10 so that the rate of increase in the damage accumulated amount Dam_dc is suppressed at the timing at which the damage accumulated amount Dam_dc further increases even when the high-rate eliminating process is executed and then exceeds the high-rate suppressing threshold Dam_th1_s.

Input/output limitations on the battery pack 10 in the high-rate suppressing process may be set to limited amounts smaller than limited amounts (limited electric powers Wout, Win) of the allowable output power SWout and the allowable input power SWin, which are set on the basis of the battery temperature Tb and the SOC shown in the first embodiment.

Specifically, when the correlation (map or function) between the damage accumulated amount Dam_dc and the limited electric power Wout_s is obtained in advance by an experiment, or the like, it is possible to calculate the limited electric power Wout_s by calculating the damage accumulated amount Dam_dc. For example, the correlation of the limited electric power Wout_s with the difference between the damage accumulated amount Dam_dc and the threshold Dam_th1_s is obtained in advance, and the limited electric power Wout_s may be set so that the limited electric power Wout_s decreases (the limited amount increases) as the difference increases. Information about the correlation between the damage accumulated amount Dam_dc and the limited electric power Wout_s may be stored in the memory 31.

In the present embodiment as well, for discharge control over the battery pack 10 at the limited electric power Wout_s limited by the high-rate suppressing process, the bidirectional DC-DC converter 41 is controlled so that an insufficient amount of electric power for a required vehicle output is compensated from the auxiliary battery 40. In this way, it is possible to suppress a decrease in drivability by exercising power performance appropriate for a vehicle request or improve fuel economy by reducing opportunities for compensating for an insufficient amount of battery output for a vehicle request with the power of the engine 27. In addition to these, it is possible to suppress high-rate degradation before the allowable output power SWout and the allowable input power SWin that are set on the basis of the battery temperature Tb and the SOC are significantly limited on the basis of the high-rate limiting threshold Dam_th1.

The high-rate suppressing process according to the present embodiment is executed in parallel with the high-rate eliminating process. That is, the high-rate eliminating process is started at the timing at which the damage accumulated amount Dam_dc exceeds the high-rate eliminating threshold Dam_th1_d, and, after that, may be continued even when the damage accumulated amount Dam_dc exceeds the threshold Dam_th1_s or the threshold Dam_th1.

In the high-rate suppressing process according to the present embodiment, for example, as shown in the example of FIG. 7, in discharge control over the battery pack 10 at the limited electric power Wout_s limited by the high-rate suppressing process, an insufficient amount of electric power due to the limited electric power Wout_s is supplied to the inverter 24, and the like, by causing the auxiliary battery 40 to output electric power, and, in charge control over the battery pack 10, the charge amount that is charged into the battery pack 10 is controlled to increase by causing the auxiliary battery 40 to output charge electric power to the battery pack 10.

In this way, by executing the high-rate eliminating process that reduces the damage accumulated amount Dam_dc in absolute value and executing the high-rate suppressing process that reduces the rate of increase in the damage accumulated amount Dam_dc in parallel, a time extends until the damage accumulated amount Dam_dc of the battery pack 10 is significantly limited beyond the threshold Dam_th1. Thus, it is possible to suppress opportunities that the allowable output power SWout and the allowable input power SWin are limited, the opportunities leading to a decrease in drivability and deterioration of fuel economy.

The high-rate eliminating process is continuously executed while the allowable output power SWout and the allowable input power SWin of the battery pack 10 are limited as shown in the first embodiment after the damage accumulated amount Dam_dc exceeds the threshold Dam_th1. With this configuration, it is possible to increase the amount of reduction in the damage accumulated amount Dam_dc during input/output limitations, so it is possible to suppress high-rate degradation.

Figure 8:
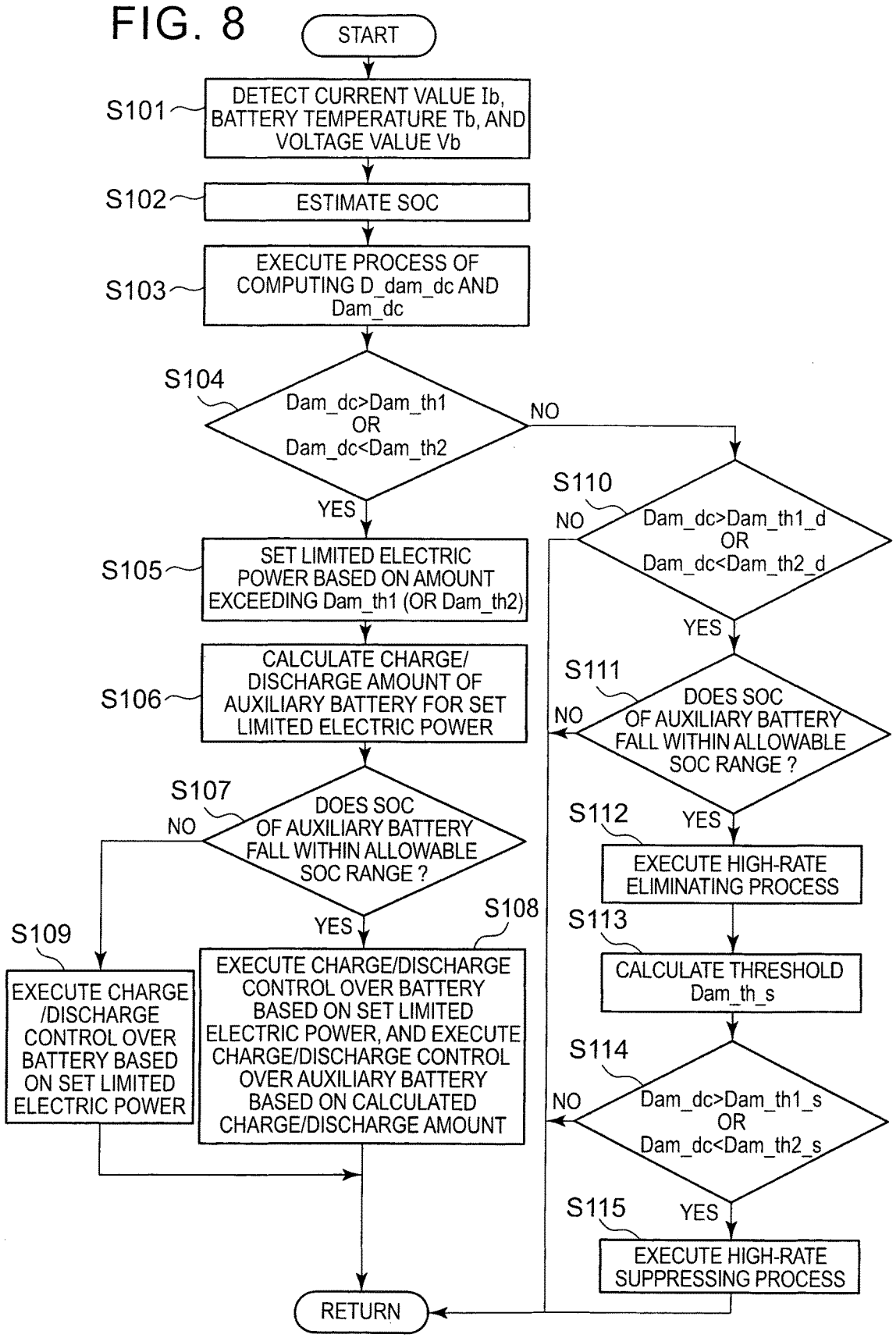
FIG. 8 is a view that shows a processing flowchart of input/output limitations on the battery pack in response to high-rate degradation in the second embodiment, and is a view that shows an example of charge/discharge control over the battery pack, including high-rate eliminating process and high-rate suppressing process and charge/discharge control over the auxiliary battery.

FIG. 8 is a view that shows a processing flowchart of input/output limitations on the battery pack 10 in response to high-rate degradation according to the present embodiment. Step S101 to step S109 are the same as the steps shown in FIG. 2, so like step numbers denote the same steps, and the description thereof is omitted. The description will be made from step S110.

When the controller 30 determines in step S104 that the condition for executing the high-rate limiting process (the damage accumulated amount Dam_dc is larger than the threshold Dam_th1 or smaller than the threshold Dam_th2) is not satisfied, the controller 30 proceeds to step S110, and determines whether the damage accumulated amount Dam_dc satisfies the condition for executing the high-rate eliminating process. Specifically, the controller 30 determines whether the damage accumulated amount Dam_dc is larger than the high-rate eliminating threshold Dam_th1_d or smaller than the threshold Dam_th2_d.

When the controller 30 determines that the damage accumulated amount Dam_dc satisfies the condition for executing the high-rate eliminating process, the controller 30 determines whether the SOC of the auxiliary battery 40 falls within the preset allowable SOC range (S111). When the SOC of the auxiliary battery 40 falls outside the preset allowable SOC range, the high-rate eliminating process is not executed. When the controller 30 determines that the damage accumulated amount Dam_dc does not satisfy the condition for executing the high-rate eliminating process, the controller 30 sets the upper limit values to the allowable output power SWout and the allowable input power SWin that are set on the basis of the battery temperature Tb and SOC of the battery pack 10, and executes charge/discharge control so that the damage accumulated amount Dam_dc does not exceed the allowable output power SWout or the allowable input power SWin.

Figure 9:
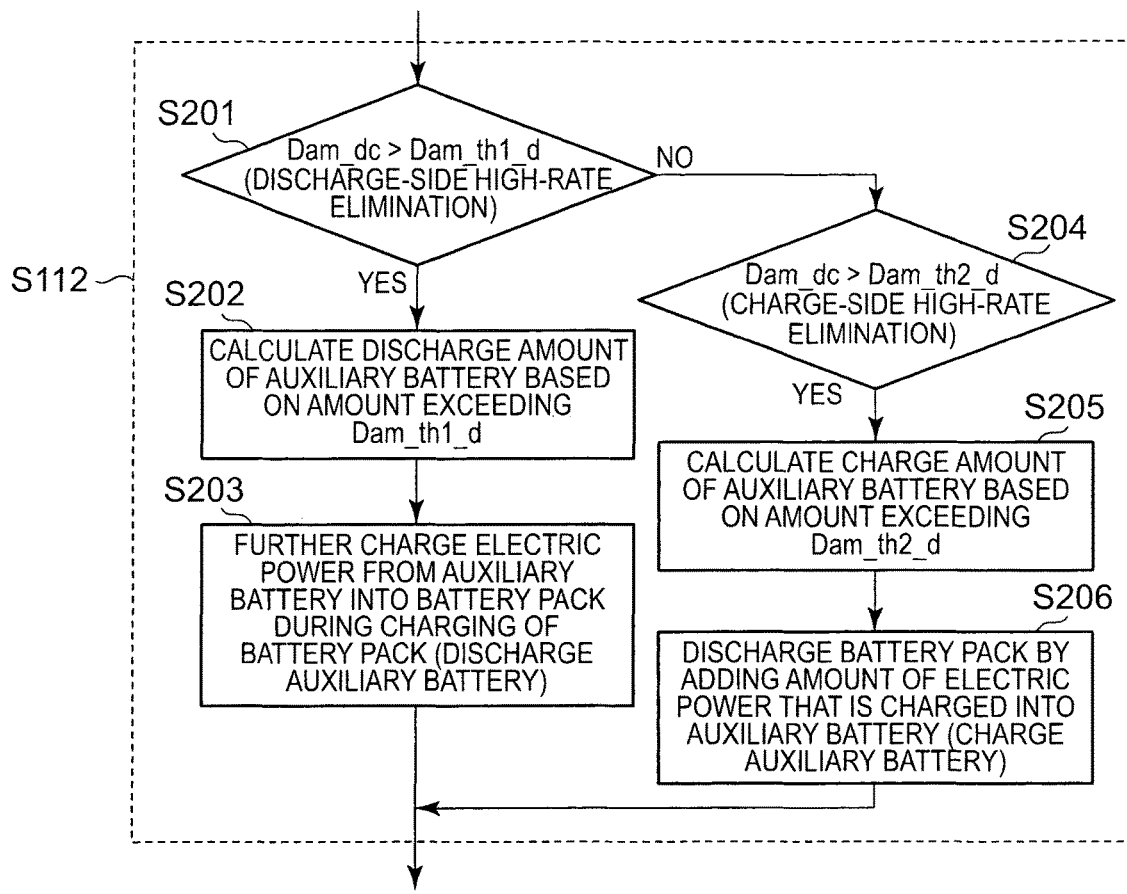
FIG. 9 is a view that shows a detailed flowchart of the high-rate eliminating process shown in FIG. 8.

When the controller 30 determines that the SOC of the auxiliary battery 40 falls within the preset allowable SOC range, the controller 30 executes the high-rate eliminating process (S112). FIG. 9 is a view that shows a detailed flowchart of the high-rate eliminating process according to the present embodiment.

As shown in FIG. 9, when the damage accumulated amount Dam_dc exceeds the high-rate eliminating threshold Dam_th1_d (S201), the controller 30 proceeds to step S202 as the discharge-side high-rate eliminating process. In step S202, the controller 30 calculates the discharge amount of the auxiliary battery 40 on the basis of a difference (excess amount) between the damage accumulated amount Dam_dc and the threshold Dam_th1_d. The controller 30 executes charge control over the battery pack 10 so that charge electric power of the calculated discharge amount is output from the auxiliary battery 40 to the battery pack 10 and the charge amount that is charged into the battery pack 10 is increased (S203).

On the other hand, when the damage accumulated amount Dam_dc exceeds the high-rate eliminating threshold Dam_th2_d (NO in S201, and S204), the controller 30 proceeds to step S205 as the charge-side high-rate eliminating process. In step S205, the controller 30 calculates the charge amount that is charged into the auxiliary battery 40 (the discharge amount that is discharged from the battery pack 10 to the auxiliary battery 40) on the basis of the difference (excess amount) between the damage accumulated amount Dam_dc and the threshold Dam_th2_d. The controller 30 executes discharge control over the battery pack 10 so that, in addition to discharge electric power to the inverter 24, and the like, the calculated discharge electric power that is charged into the auxiliary battery 40 is further output (S206).

Figure 10:
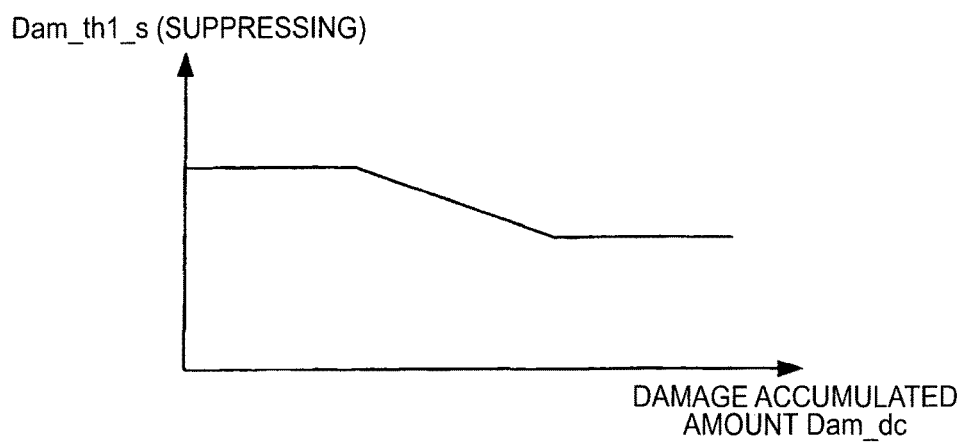
FIG. 10 is a graph that shows a high-rate suppressing threshold and a damage accumulated amount.

Referring back to FIG. 8, the controller 30 calculates the threshold Dam_th1_s of the high-rate suppressing process in step S113. The threshold Dam_th1_s may be calculated on the basis of the damage accumulated amount Dam_dc. FIG. 10 is a view that shows the correlation between the damage accumulated amount Dam_dc and the threshold Dam_th1_s. As shown in FIG. 10, when the damage accumulated amount Dam_dc is large, the threshold Dam_th1_s may be set so as to be relatively low. When the damage accumulated amount Dam_dc is small, the threshold Dam_th1_s may be set so as to be relatively high.

This is because high-rate degradation is suppressed by early executing the high-rate suppressing process when the damage accumulated amount Dam_dc is large, and the input and output limited amounts of the battery pack 10 are increased (the limited electric power Wout is reduced) by setting the threshold Dam_th1_s so as to be relatively low, thus further increasing high-rate suppressing function. The input and output limited amounts of the battery pack 10 are calculated on the basis of the difference between the damage accumulated amount Dam_dc and the threshold Dam_th1_s. This also applies to the threshold Dam_th2_s.

The controller 30 determines on the basis of the thresholds Dam_th1_s, Dam_th2_s calculated in step S113 whether the damage accumulated amount Dam_dc satisfies the condition for executing the high-rate suppressing process (the damage accumulated amount Dam_dc is larger than the threshold Dam_th1_s or smaller than the threshold Dam_th2_s) (S114). When it is determined that the damage accumulated amount Dam_dc does not satisfy the condition for executing the high-rate suppressing process, the controller 30 executes charge/discharge control so that the damage accumulated amount Dam_dc does not exceed the allowable output power SWout or the allowable input power SWin as in the case of step S110.

Figure 11:
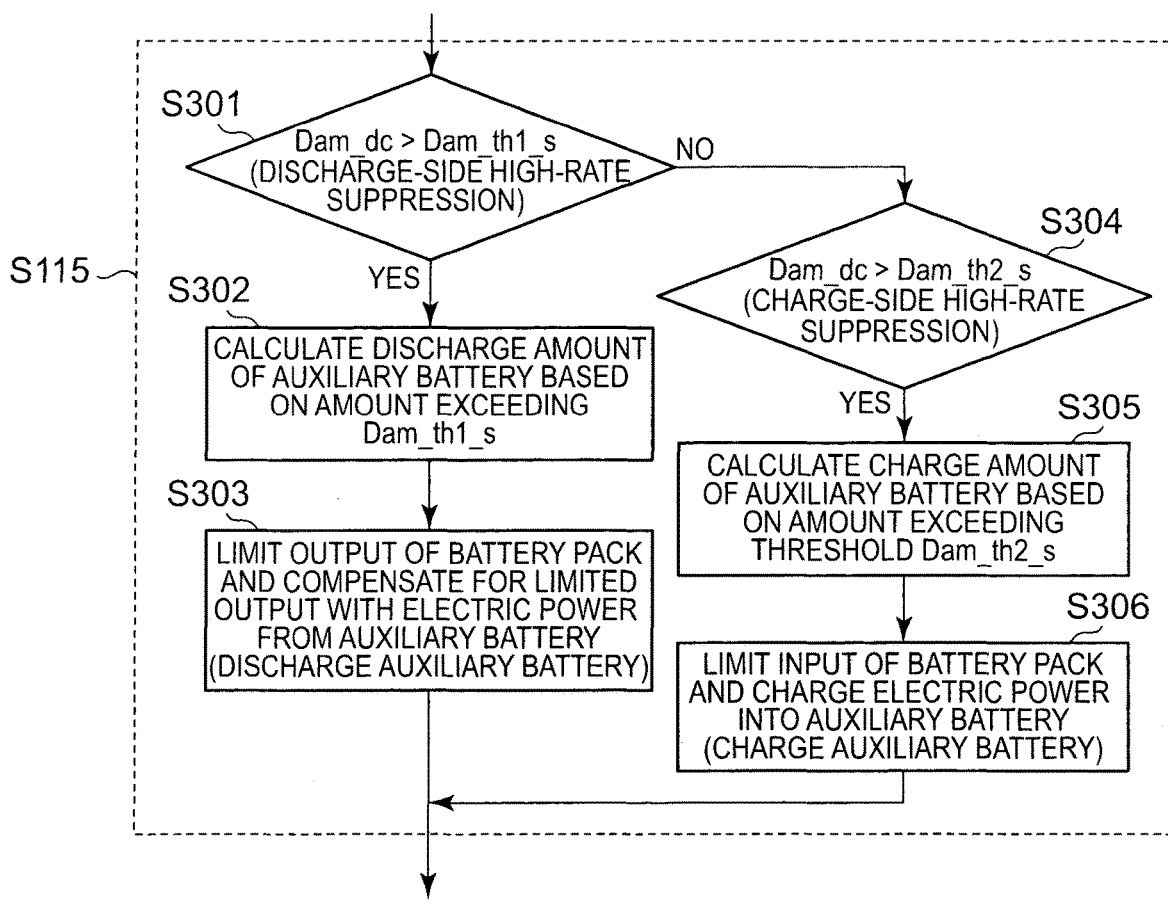
FIG. 11 is a view that shows the detailed flowchart of the high-rate suppressing process shown in FIG. 8.

When the controller 30 determines that the damage accumulated amount Dam_dc satisfies the condition for executing the high-rate suppressing process, the controller 30 executes the high-rate suppressing process (S115). FIG. 11 is a view that shows a detailed flowchart of the high-rate suppressing process according to the present embodiment.

As shown in FIG. 11, when the damage accumulated amount Dam_dc exceeds the high-rate suppressing threshold Dam_th1_s (S301), the controller 30 proceeds to step S302 as the discharge-side high-rate suppressing process. In step S302, the controller 30 calculates the discharge amount of the auxiliary battery 40 on the basis of the difference (excess amount) between the damage accumulated amount Dam_dc and the threshold Dam_th1_s. The calculated discharge amount of the auxiliary battery 40 is also the output limited amount of the battery pack 10. The controller 30 executes discharge control over the battery pack 10 on the basis of the calculated limited amount of the battery pack 10, executes control so that electric power of the calculated discharge amount is output from the auxiliary battery 40 to the inverter 24, and the like, and executes control so that an insufficient amount of electric power due to output limitation on the battery pack 10 is supplied from the auxiliary battery 40 (S303).

On the other hand, when the damage accumulated amount Dam_dc exceeds the high-rate suppressing threshold Dam_th2_s (NO in S301, and S304), the controller 30 proceeds to step S305 as the charge-side high-rate suppressing process. In step S305, the controller 30 calculates the charge amount that is charged into the auxiliary battery 40 (the charge amount that allows part of regenerated electric power to be charged into the auxiliary battery 40) on the basis of the difference (excess amount) between the damage accumulated amount Dam_dc and the threshold Dam_th2_s. The calculated charge amount of the auxiliary battery 40 is the input limited amount of the battery pack 10. The controller 30 executes charge control over the battery pack 10 on the basis of the calculated limited amount of the battery pack 10, executes control so that electric power of the calculated charge amount is input to the auxiliary battery 40 and executes control so that an amount of non-storable electric power due to the input limitation on the battery pack 10 is charged into the auxiliary battery 40 (S306).

Figure 12:
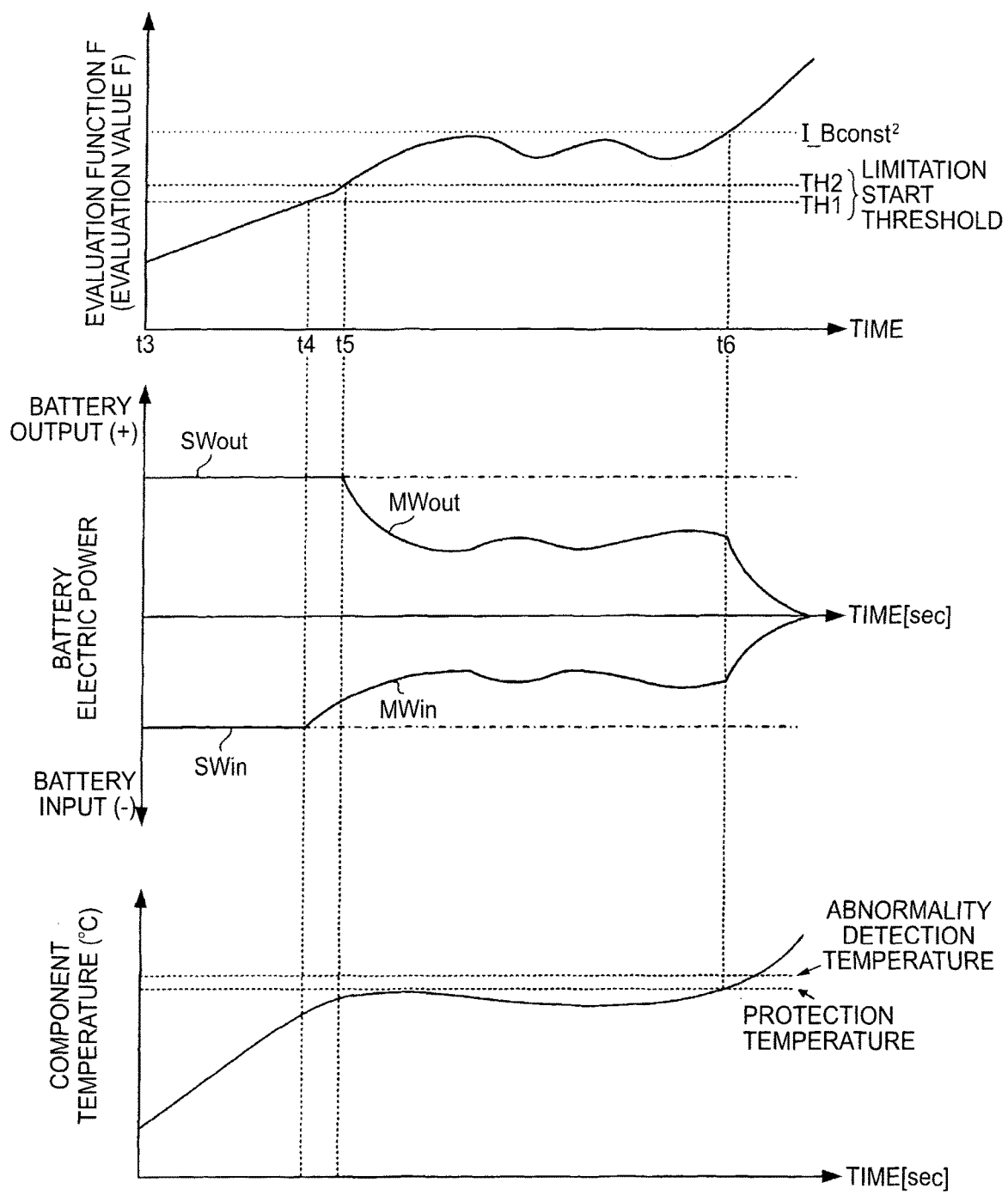
FIG. 12 is a time chart for illustrating control for limiting input and output powers in response to an increase in the temperature of an energization component in a third embodiment.
Figure 13:
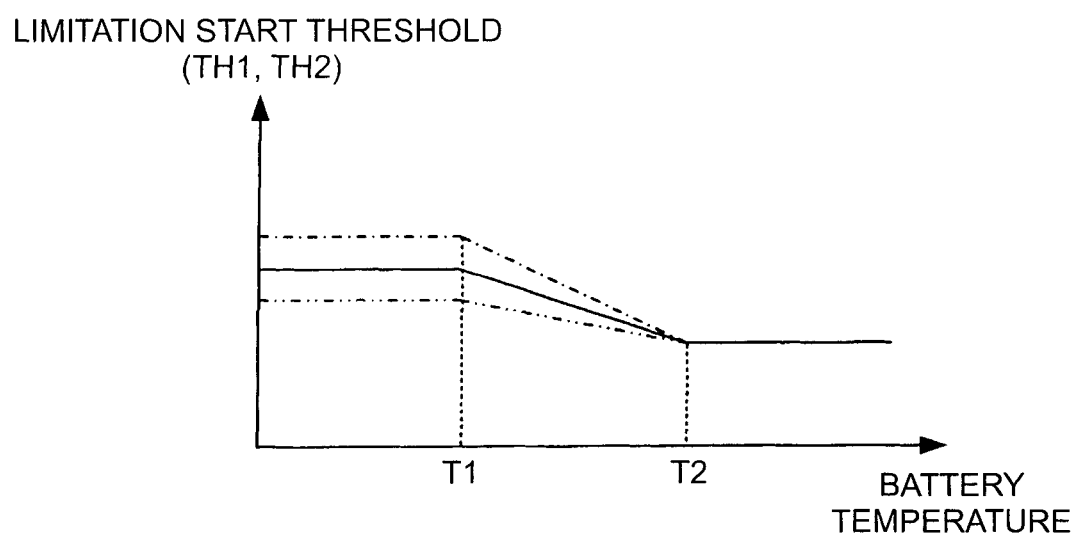
FIG. 13 is a graph that shows the correlation between an input/output power limitation start threshold and a battery temperature in response to an increase in the temperature of the energization component in the third embodiment.
Figure 14:
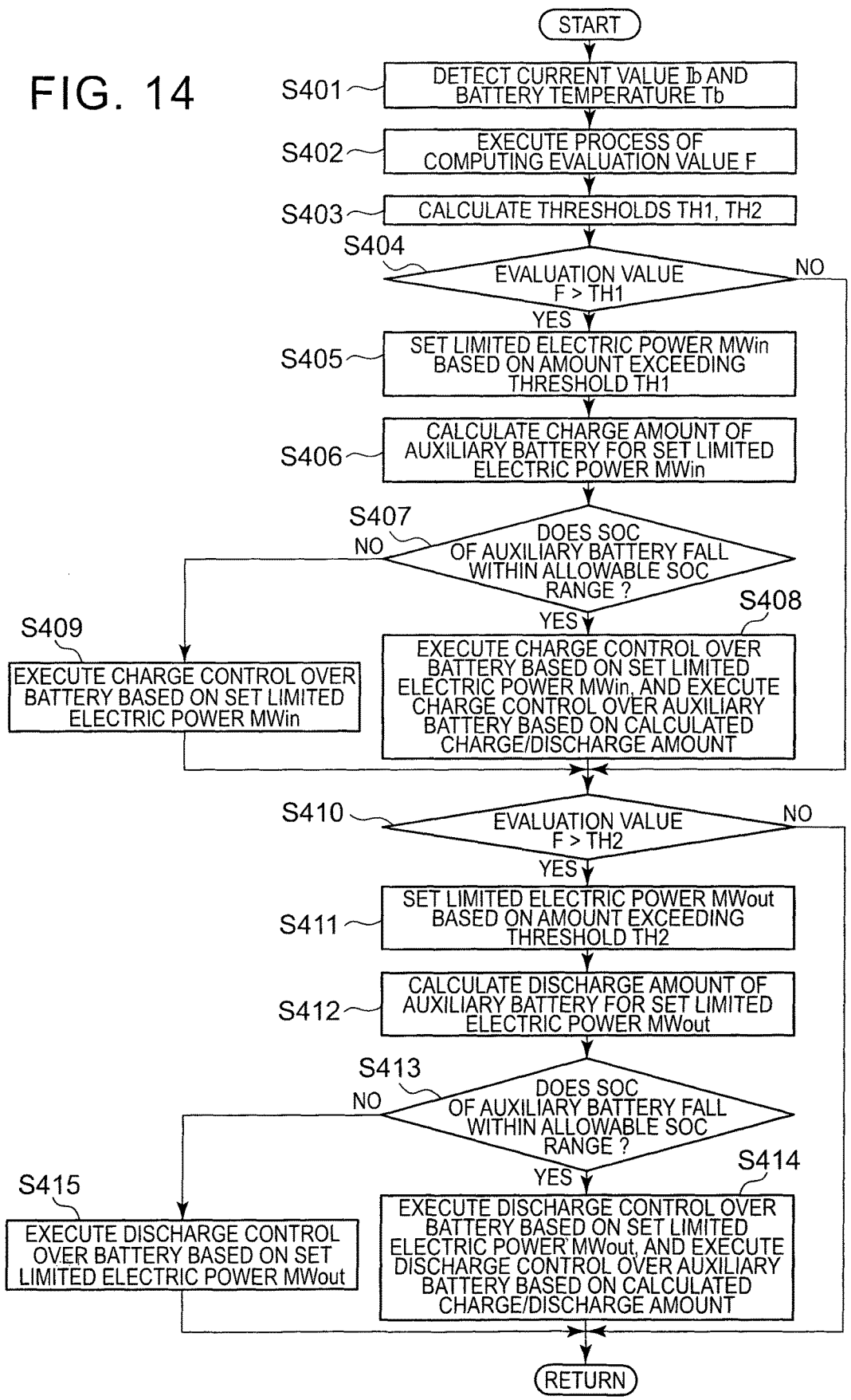
FIG. 14 is a view that shows the processing flowchart of a process of limiting input and output powers and charge/discharge control over the auxiliary battery in response to an increase in the temperature of the energization component in the third embodiment.

A third embodiment will be described. FIG. 12 to FIG. 14 are views that show the third embodiment. In the present embodiment, for the allowable output power and allowable input power of the battery pack 10, which are limited in view of overheat protection of current-carrying components provided in the current path of the battery pack 10, an insufficient amount of electric power for a required vehicle output is supplied with electric power from the auxiliary battery 40, and part of regenerated electric power that is not entirely charged into the battery pack 10 is charged into the auxiliary battery.

When current flows through the battery pack 10, current also flows through the current-carrying components (for example, a wire harness, such as the positive electrode line PL and the negative electrode line NL, the system main relays SMR-B, SMR-G, a fuse, and the like) electrically connected to the battery pack 10 that constitutes the battery system. Joule heat is generated in each of these current-carrying components in the current path. Therefore, if the temperature of each of the current-carrying components increases and exceeds an allowable temperature (heat-resistant temperature), there is a concern that the current-carrying components do not function normally. Therefore, overheat protection is required in correspondence with the magnitude of current flowing therethrough for the current-carrying components included in the current path.

In the present embodiment, an evaluation function that expresses a heating state of each of the current-carrying components on the basis of a current flowing through the current-carrying component and a current-carrying time, and charge/discharge electric powers of the battery pack 10 are limited on the basis of an output value of the evaluation function (evaluation value F indicating a heating state). In this way, an increase in the temperature of each of the current-carrying components is suppressed by limiting current flowing through the current-carrying component.

Generally, it is known that heat generated by each of the current-carrying component is proportional to the square of a current value flowing through the current-carrying component. When this relationship is expressed by an evaluation function (evaluation value F), the following mathematical expression (3) is obtained.

$$F(n+1)=\{(K-1)\times F(n)+I(n)^2\}/K \qquad (3)$$

In the mathematical expression (3), n denotes the number of times of control cycles from the start of control, that is, an elapsed time. When there is no previously calculated evaluation value F(n), an initial value of the evaluation value F may be used. I(n) denotes a current value flowing through each current-carrying component at the time when the number of times of control cycles is n. A smoothing coefficient K is a constant larger than or equal to 1, and is set in advance on the basis of a change in the temperature of each individual current-carrying component. The smoothing coefficient K is set by using a map, or the like, determined by an experiment, or the like, in advance.

Each current-carrying component increases in temperature with time after the start of energization. The temperature of each current-carrying component increases as the current value Ib increases, and increases in proportion to the square of the current value Ib. A behavior that increases in proportion to the square of the current value Ib is obtained in advance by an experiment for each current-carrying component that requires overheat protection, and the coefficient K for the evaluation value F in the mathematical expression (3) may be determined so as to match with the behavior (for example, curve). Thus, it is possible to estimate heat generated from each current-carrying component on the basis of an energized current and an energized time.

At this time, the smoothing coefficient K has a different value for each individual current-carrying component, and the smoothing coefficient K may be determined for each individual current-carrying component. For example, the smoothing coefficient K may be set with reference to the current-carrying component having the lowest temperature upper limit value of heat-resistant protection among the current-carrying components or a single smoothing coefficient K may be set by respectively assigning weights to the smoothing coefficients K of the individual current-carrying components. A method of calculating an evaluation value F(n) is not limited to this configuration. For example, in consideration of an energized time, an evaluation value F may be calculated on the basis of the energized time and the current value Ib.

For the current-carrying components, in the present embodiment, heat generated by each current-carrying component is controlled by adjusting current (electric power) so that the evaluation value F does not exceed a threshold that is determined from an overheat limit of the current-carrying component.

FIG. 12 is a time chart for illustrating control for limiting input and output powers according to the present embodiment. In FIG. 12, the abscissa axis represents time. The ordinate axis represents an evaluation value F, a battery electric power of the battery pack 10 and a temperature of each current-carrying component.

In the example of FIG. 12, when energization of each current-carrying component is started from time t3, the temperature of each current-carrying component gradually increases with time. The evaluation value F indicating the heating state of each current-carrying component also similarly increases in correspondence with an increase in the temperature of each current-carrying component. Between time t3 and time t4, the allowable output power SWout and the allowable input power SWin that are determined on the basis of the above-described battery temperature Tb and SOC of the battery pack 10 are set.

At time t4 at which the evaluation value F exceeds a threshold TH1, the limited electric power MWin smaller than the allowable input power SWin is set so that the allowable input power SWin is further limited (corrected from SWin to MWin). Thus, for example, it is possible to reduce the charge amount that regenerated electric power generated by regenerative braking with the motor generator is input to the battery pack 10, so it is possible to reduce current supplied to (heat generated by) each current-carrying component.

On the other hand, at time t5 at which the evaluation value F exceeds a threshold TH2, the limited electric power MWout_smaller than the allowable output power SWout is set so that the allowable output power SWout is further limited (corrected from SWout to MWout). Thus, for example, the amount of electric power that is supplied to the inverter 24 is reduced, so it is possible to reduce current supplied to (heat generated by) each current-carrying component.

In this way, the input and output of the battery pack 10 are limited in view of protection against an increase in temperature of each current-carrying component, so, as shown in FIG. 12, an increase in the temperature of each current-carrying component is suppressed from time t5 to time t6. When the evaluation value F becomes larger than a threshold I_Bconst$^2$ corresponding to an allowable energized current value I_Bconst of each current-carrying component at time t6, an allowable overheat temperature of each current-carrying component is exceeded, so it is possible to execute control so as to stop charging and discharging of the battery pack 10 in order to protect each current-carrying component.

On the other hand, after time t6, when the evaluation value F becomes lower than the threshold TH1 or the threshold TH2 because an increase in the temperature of each current-carrying component is suppressed, the limited electric powers MWout, MWin are respectively returned to the allowable output power SWout and the allowable input power SWin determined on the basis of the battery temperature Tb and the SOC accordingly.

The threshold TH1 and the threshold TH2 each are a threshold for starting input/output limitations on the battery pack 10. The threshold TH1 and the threshold TH2 each are a heating threshold for suppressing an overheat of each current-carrying component. The heating threshold is set in advance on the basis of the allowable energized current value I_Bconst corresponding to the allowable overheat temperature of each current-carrying component. At this time, a limitation start threshold may be changed on the basis of the battery temperature. FIG. 13 is a graph that shows the correlation between a limitation start threshold and a battery temperature of the battery pack 10. For example, as shown in FIG. 13, the limitation start threshold may be set so as to be a constant value until the battery temperature becomes T1. With an increase in the battery temperature from T1 to T2 (T1<T2), the limitation start threshold may be set so as to gradually decrease. At the battery temperature after T2, the limitation threshold may be set so as to be a constant value.

When the limitation start threshold is set to a relatively small value, it is possible to appropriately suppress an increase in the temperature of the current-carrying component by early executing input/output limitations in response to an increase in the evaluation value F. When the limitation start threshold is set to a relatively large value, the threshold TH1 and the threshold TH2 (values corresponding to the square of the allowable energized current value) also increase, so it is possible to delay the timing at which the input/output limitations are imposed on an increase in the evaluation value F.

Even when the battery temperature is lower than the temperature T1 as shown in FIG. 13, but when the temperature of cooling air (intake air temperature) that cools the battery pack 10 is higher than a predetermined temperature, the limitation start threshold is allowed to be set to a relatively small value (alternate long and two-short dashed line) than when the temperature of cooling air is lower than the predetermined temperature. When the temperature of cooling air (intake air temperature) that cools the battery pack 10 is lower than the predetermined temperature, the limitation start threshold is allowed to be set to a large value (alternate long and short dashed line). By setting in this way, the threshold TH1 and the threshold TH2 also decrease, so it is possible to appropriately suppress an increase in the temperature of each current-carrying component in consideration of the cooling efficiency of the battery pack 10.

In the example of FIG. 12, the threshold TH1 for the limited electric power MWin is set so as to be smaller than the threshold TH2 for the limited electric power MWout (TH1<TH2); however, the magnitude relation is not limited to this configuration. The threshold TH1 may be set so as to be larger than the threshold TH2.

FIG. 14 is a view that shows a processing flowchart of input/output limitations on the battery pack 10 for suppressing an increase in the temperature of each current-carrying component according to the present embodiment. As shown in FIG. 14, the controller 30 executes the process of computing the evaluation value F for evaluating the heating state of each current-carrying component by using the current value Ib and battery temperature Tb of the battery pack 10, which are detected from the sensors, (S401, S402) in charge/discharge control over the battery pack 10 after the ignition switch is turned on.

Subsequently, the controller 30 calculates the thresholds TH1, TH2 from the correspondence map between the battery temperature Tb of the battery pack 10 and the limitation start threshold, shown in FIG. 13 (S403). The correspondence map between the battery temperature Tb of the battery pack 10 and the limitation start threshold, shown in FIG. 13, is stored in the memory 31 in advance.

The controller 30 determines whether the evaluation value F exceeds the threshold TH1 (S404). When the controller 30 determines that the evaluation value F is larger than the threshold TH1 (YES in S404), the limited electric power MWin is set on the basis of the difference between the evaluation value F and the threshold TH1 (S405). When the controller 30 determines that the evaluation value F is smaller than or equal to the threshold TH1, the controller 30 sets the upper limit values to the allowable output power SWout and the allowable input power SWin that are set on the basis of the battery temperature Tb and SOC of the battery pack 10, and executes charge/discharge control so that the discharge electric power and the charge electric power respectively do not exceed the allowable output power SWout and the allowable input power SWin.

A specific method of calculating the limited electric power MWin may be, for example, as follows. When the correlation (map or function) between the valuation value F and the limited electric power MWin is obtained in advance by an experiment, or the like, it is possible to calculate the limited electric power MWin by calculating the evaluation value F. For example, the correlation of the limited electric power MWin with the difference between the evaluation value F and the threshold TH1 is obtained in advance, and it is possible to set the limited electric power MWin so as to decrease (the limited amount increases) as the difference increases. Information about the correlation between the evaluation value F and the limited electric power MWin may be stored in the memory 31.

The controller 30 calculates the difference between the allowable input power SWin and the limited electric power MWin, that is, the limited amount of the allowable input power of the battery pack 10 (S406). The limited amount of the allowable input power is an upper limit value of the amount of charge electric power that is allowed by the auxiliary battery 40.

The controller 30 determines whether the SOC of the auxiliary battery 40 falls within the preset allowable SOC range (S407). For example, when the SOC is higher than the allowable SOC range, the controller 30 executes control so that the auxiliary battery 40 is not charged in order to prevent overcharging of the auxiliary battery 40 (NO in S407). That is, the controller 30 executes only charge control over the battery pack 10 with the upper limit set to the limited electric power MWin on a vehicle request (S409).

On the other hand, when the controller 30 determines in step S407 that the SOC of the auxiliary battery 40 falls within the preset allowable SOC range, the controller 30 executes charge control with the upper limit set to the limited electric power MWin on a vehicle request, and controls the bidirectional DC-DC converter 41 (S408). The bidirectional DC-DC converter 41 is controlled so as to charge the auxiliary battery 40 with part of regenerated electric power with the upper limit set to the limited amount that is the difference between the allowable input power SWin and the limited electric power MWin. The regenerated electric power that is not entirely charged into the battery pack 10 results from setting the limited electric power MWin on a vehicle request.

Subsequently, the controller 30 proceeds to step S410, and determines whether the evaluation value F exceeds the threshold TH2. When the controller 30 determines that the evaluation value F is larger than the threshold TH2 (YES in S410), the controller 30 sets the limited electric power MWout on the basis of the difference between the evaluation value F and the threshold TH2 (S411). When the controller 30 determines that the evaluation value F is smaller than the threshold TH2, the controller 30 executes charge/discharge control so that the discharge electric power and the charge electric power respectively do not exceed the allowable output power SWout and the allowable input power SWin that are set on the basis of the battery temperature Tb and SOC of the battery pack 10.

A specific method of calculating the limited electric power MWout may be, for example, as follows, as in the case of the limited electric power MWin. When the correlation (map or function) between the evaluation value F and the limited electric power MWout is obtained in advance by an experiment, or the like, it is possible to calculate the limited electric power MWout by calculating the evaluation value F. For example, the correlation of the limited electric power MWout with the difference between the evaluation value F and the threshold TH2 is obtained in advance, and it is possible to set the limited electric power MWout so as to decrease (the limited amount increases) as the difference increases. Information about the correlation between the evaluation value F and the limited electric power MWout may be stored in the memory 31.

The controller 30 calculates the difference between the allowable output power SWout and the limited electric power MWout, that is, the limited amount of the allowable output power of the battery pack 10 (S412). The limited amount of the allowable output power is an upper limit value of the amount of discharge electric power that is allowed by the auxiliary battery 40.

The controller 30 determines whether the SOC of the auxiliary battery 40 falls within the preset allowable SOC range (S413). For example, when the SOC is lower than the allowable SOC range, the controller 30 executes control so that electric power is not supplied from the auxiliary battery 40 to the inverter 24 in order to prevent overdischarging of the auxiliary battery 40 (NO in S413). That is, the controller 30 executes only discharge control over the battery pack 10 with the upper limit set to the limited electric power MWout on a required vehicle output (S415).

On the other hand, when the controller 30 determines in step S413 that the SOC of the auxiliary battery 40 falls within the preset allowable SOC range, the controller 30 executes discharge control with the upper limit set to the limited electric power MWout on a required vehicle output, and controls the bidirectional DC-DC converter 41 (S414). The bidirectional DC-DC converter 41 is controlled so as to discharge an insufficient amount of electric power from the auxiliary battery 40 with the upper limit value set to the limited amount that is the difference between the allowable output power SWout and the limited electric power MWout. The insufficient amount of electric power results from setting the limited electric power MWout on the required vehicle output.

In this way, in the present embodiment, even when the input and output of the battery pack 10 are limited in view of allowable heat-resistant temperature protection of the current-carrying components of the battery pack 10, it is possible to suppress a decrease in drivability during vehicle traveling by propelling the vehicle by using the output of the battery pack 10 and the output of the auxiliary battery 40 and to improve fuel economy by reducing opportunities for compensating for the amount of battery output insufficient for the vehicle request with the power of the engine 27. During braking of the vehicle, it is possible to efficiently store regenerated electric power in the battery pack 10 and the auxiliary battery 40, so it is possible to suppress deterioration of fuel economy.

Figure 15:
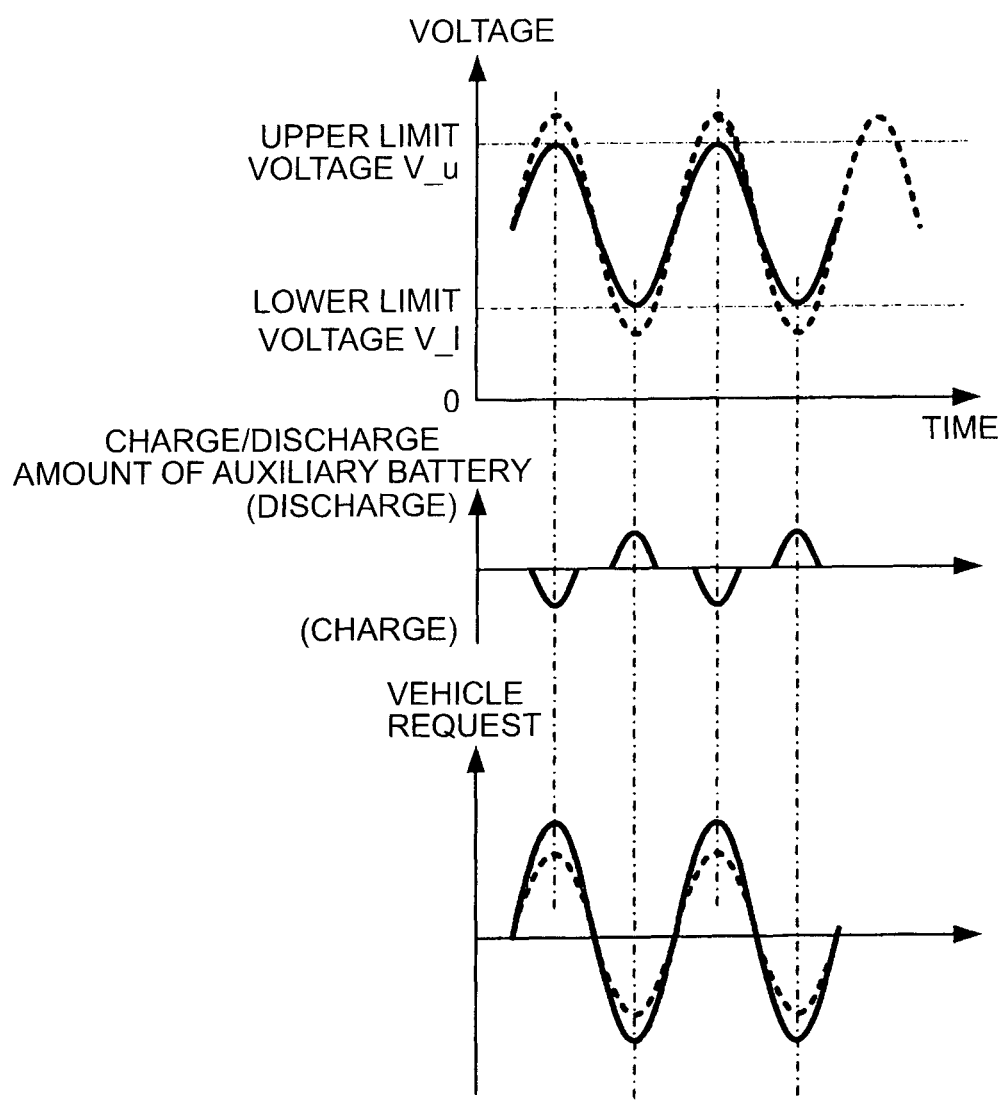
FIG. 15 is a time chart that shows the correlation of input/output limitations and a charge/discharge amount of the auxiliary battery in response to overcharging (upper limit voltage) and overdischarging (lower limit voltage) of the battery pack in a fourth embodiment.
Figure 16:
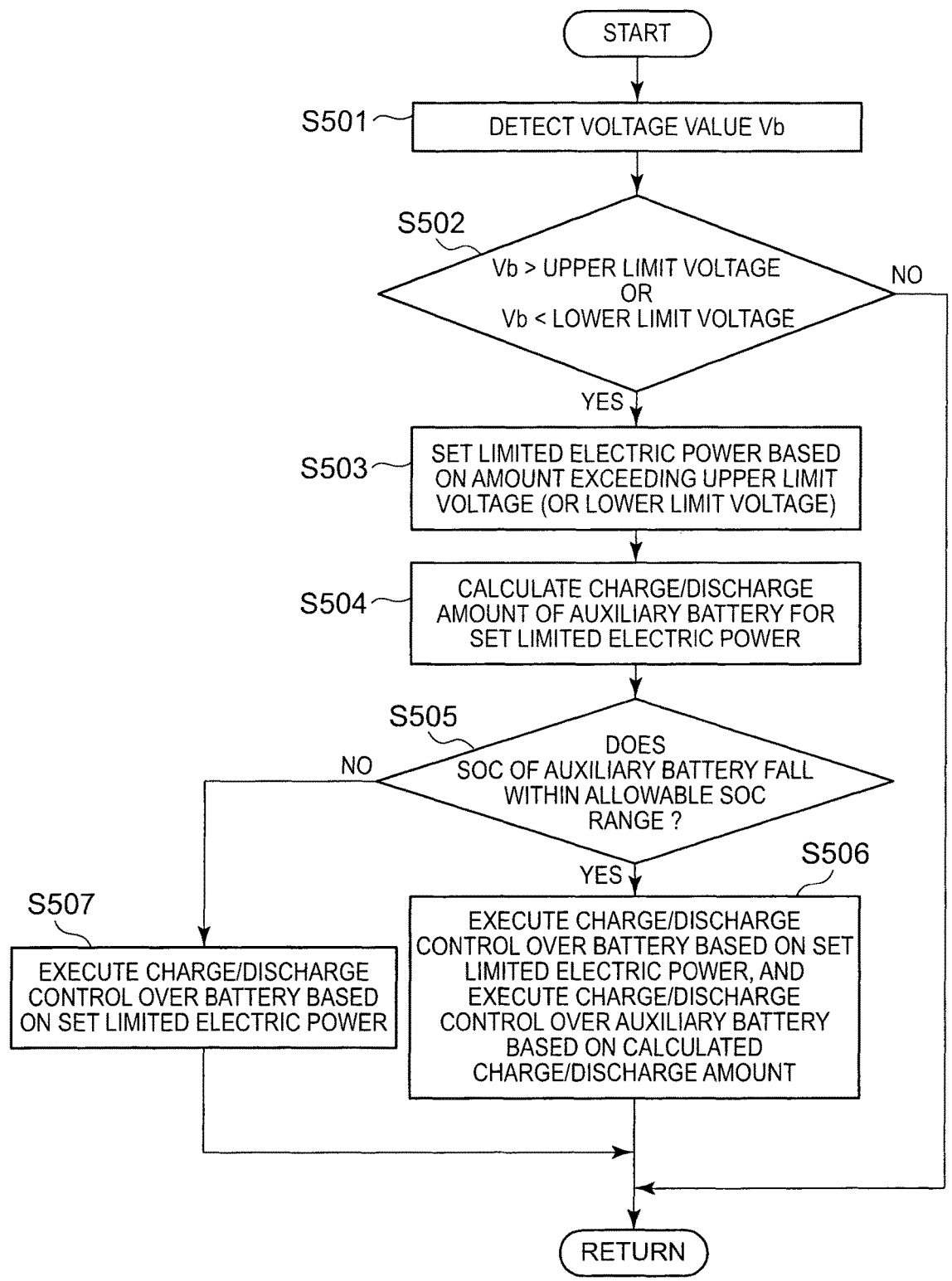
FIG. 16 is a view that shows the processing flowchart of input/output limitation process and charge/discharge control over the auxiliary battery in response to overcharging (upper limit voltage) and overdischarging (lower limit voltage) of the battery pack in the fourth embodiment.

A fourth embodiment will be described. FIG. 15 and FIG. 16 are views that show the fourth embodiment. Other than the viewpoint of battery protection described in the first and second embodiments as well, for the input and output powers of the battery pack 10, which are limited in view of protection of the battery pack 10 against overdischarging and overcharging, it is possible to supply an insufficient amount of electric power for a required vehicle output with electric power from the auxiliary battery 40, and charge the auxiliary battery with part of regenerated electric power that is not entirely charged into the battery pack 10.

For example, it is known that the battery pack 10 degrades in its battery performance when overcharged or overdischarged and, as a result, battery life shortens. Therefore, an upper limit voltage (upper limit SOC) for overcharging and a lower limit voltage (lower limit SOC) for overdischarging are obtained in advance by an experiment, or the like, and charge/discharge control with set allowable input and output powers other than the battery temperature Tb or the SOC may be executed.

FIG. 15 is a time chart for illustrating the correlation between the upper limit voltage and lower limit voltage of the battery pack 10 and input/output limitations. In FIG. 15, the abscissa axis represents time. The ordinate axes respectively represent the voltage of the battery pack 10 and a battery output.

As shown in FIG. 15, when an electric power that exceeds the upper limit voltage is input to the battery pack 10, the controller 30 is able to execute charge control in which input power is limited so as not to exceed the upper limit voltage. In the graph that shows the voltage in the example of FIG. 15, it is possible to execute charge control in which input power is limited in accordance with a voltage behavior indicated by the continuous line so as not to exceed the upper limit voltage. The controller 30 is able to execute discharge control in which output power is limited in accordance with a voltage behavior indicated by the continuous line in the graph showing the voltage in the example of FIG. 15 so as not to be lower than the lower limit voltage.

In the present embodiment, as in the case of the example of FIG. 15, for the output power of the battery pack 10, which is limited so as not to exceed the lower limit voltage, an insufficient amount of electric power for a required vehicle output is compensated by electric power from the auxiliary battery 40. For the input electric power of the battery pack 10, which is limited so as not to exceed the upper limit voltage, part of regenerated electric power that is not entirely charged into the battery pack 10 is charged into the auxiliary battery 40.

FIG. 16 is a view that shows a processing flowchart of input/output limitations on the battery pack 10 by using the upper limit voltage or the lower limit voltage and charge/discharge control over the auxiliary battery 40.

As shown in FIG. 16, in charge/discharge control over the battery pack 10 after the ignition switch is turned on, the controller 30 determines whether the voltage value Vb of the battery pack 10, which is detected from the voltage sensor 21, is higher than the upper limit voltage or lower than the lower limit voltage or not (S501, S502).

For example, when the controller 30 determines that the voltage value Vb is higher than the upper limit voltage (YES in S502), the controller 30 sets the limited electric power Win on the basis of a difference between the voltage value Vb and the upper limit voltage (S503).

A specific method of calculating the limited electric power Win may be, for example, as follows. When the correlation (map or function) between the voltage value Vb and the limited electric power Win is obtained in advance by an experiment, or the like, it is possible to calculate the limited electric power Win by calculating the voltage value Vb. For example, the correlation of the limited electric power Win with the difference between the voltage value Vb and the upper limit voltage is obtained in advance, and it is possible to set the limited electric power Win so as to decrease (the limited amount increases) as the difference increases. Information about the correlation between the voltage value Vb and the limited electric power Win may be stored in the memory 31.

The controller 30 calculates the difference between the voltage value Vb and the upper limit voltage, that is, the limited amount of the allowable input power of the battery pack 10 (S504). The limited amount of the allowable input power is an upper limit value of the amount of charge electric power that is allowed by the auxiliary battery 40.

The controller 30 determines whether the SOC of the auxiliary battery 40 falls within the preset allowable SOC range (S505). For example, when the SOC is higher than the allowable SOC range, the controller 30 executes control so that the auxiliary battery 40 is not charged in order to prevent overcharging of the auxiliary battery 40 (NO in S505). That is, the controller 30 executes only charge control over the battery pack 10 with the upper limit set to the limited electric power Win on a vehicle request (5507).

On the other hand, when the controller 30 determines in step S505 that the SOC of the auxiliary battery 40 falls within the preset allowable SOC range, the controller 30 executes charge control with the upper limit set to the limited electric power Win on a vehicle request, and controls the bidirectional DC-DC converter 41 (5506). The bidirectional DC-DC converter 41 is controlled so as to charge the auxiliary battery 40 with part of regenerated electric power with the upper limit value set to the limited amount that is the difference between the voltage value Vb and the upper limit voltage. The regenerated electric power that is not entirely charged into the battery pack 10 results from setting the limited electric power Win on a vehicle request.

In the example of FIG. 16, when the voltage value Vb is lower than the lower limit voltage, the limited electric power Wout is set on the basis of the difference between the voltage value Vb and the lower limit voltage in step S503. In step S504, the limited amount of the allowable output power of the battery pack 10 is calculated. The limited amount is the difference between the voltage value Vb and the lower limit voltage.

When the controller 30 determines in step S505 that the SOC of the auxiliary battery 40 falls within the preset allowable SOC range, the controller 30 executes discharge control with the upper limit set to the limited electric power Wout on a vehicle request, and controls the bidirectional DC-DC converter 41. The bidirectional DC-DC converter 41 is controlled so as to discharge an insufficient amount of electric power from the auxiliary battery 40 with the upper limit value set to the limited amount that is the difference between the voltage value Vb and the lower limit voltage. The insufficient amount of electric power results from setting the limited electric power Wout on a vehicle request.

The allowable input power SWin and the allowable output power SWout according to the present embodiment may be input and output powers that are obtained on the basis of the battery temperature and SOC of the battery pack 10 as in the case of the first embodiment, or may be upper limit input and output powers preset in correspondence with the upper limit voltage and the lower limit voltage.

In this way, in the present embodiment, the following mode is described. For the input and output powers of the battery pack 10, which are limited in view of protection of the battery pack 10 against overdischarging or overcharging, an insufficient amount of electric power for a required vehicle output is compensated by electric power from the auxiliary battery 40, and part of regenerated electric power that is not entirely charged into the battery pack 10 is charged into the auxiliary battery 40. For the input and output powers of the battery pack 10, which are limited in view of protection of the battery pack 10 against an increase in temperature as well, it is possible to execute charge/discharge control over the auxiliary battery 40 as in the case of the present embodiment.

The battery pack 10 generates heat when charged or discharged, and the battery temperature Tb increases. It is known that battery degradation is accelerated when the battery temperature Tb increases to a high temperature, so it is required to appropriately control charge/discharge current. As in the case of the above-described third embodiment, charge/discharge currents of the battery pack 10 are also controlled in view of protection of current-carrying components. Therefore, an upper limit value of each of charge/discharge currents is set in advance, and, when charge current or discharge current that exceeds the upper limit current (overcurrent) flows through the battery pack 10, the controller 30 is able to execute charge/discharge control in which input electric power or output electric power is limited so as not to exceed the upper limit current.

Upper limit values of input and output powers (electric power excess thresholds) of the battery pack 10 may be obtained in advance by using the upper limit voltage and the lower limit voltage that are set in view of protection of the battery pack 10 against overdischarging and overcharging and the upper limit current that is set in view of protection of the battery pack 10 against an increase in temperature. While the input and output powers of the battery pack 10, exceeding these upper limit values obtained in advance, are limited, it is possible to compensate for an insufficient amount of electric power for a required vehicle output with electric power from the auxiliary battery 40 and charge the auxiliary battery 40 with part of regenerated electric power that is not entirely charged into the battery pack 10.

When input/output limitations on the battery pack 10 in view of protection of the battery pack 10 against overdischarging and overcharging, input/output limitations on the battery pack 10 in view of protection against overcurrent and input/output limitations in view of protection of the battery pack 10 against an excessive electric power are individually carried out, any one input/output limitations on the battery pack 10 and charge/discharge control over the auxiliary battery 40 may be executed by setting the order of priority in advance. For example, the order of priority may be set in advance such that input/output limitations on the battery pack 10 in view of protection of the battery pack 10 against overdischarging and overcharging have the highest priority, input/output limitations on the battery pack 10 in view of protection against overcurrent have the second highest priority and input/output limitations in view of protection of the battery pack 10 against excessive electric power have the lowest priority.

Figure 17:
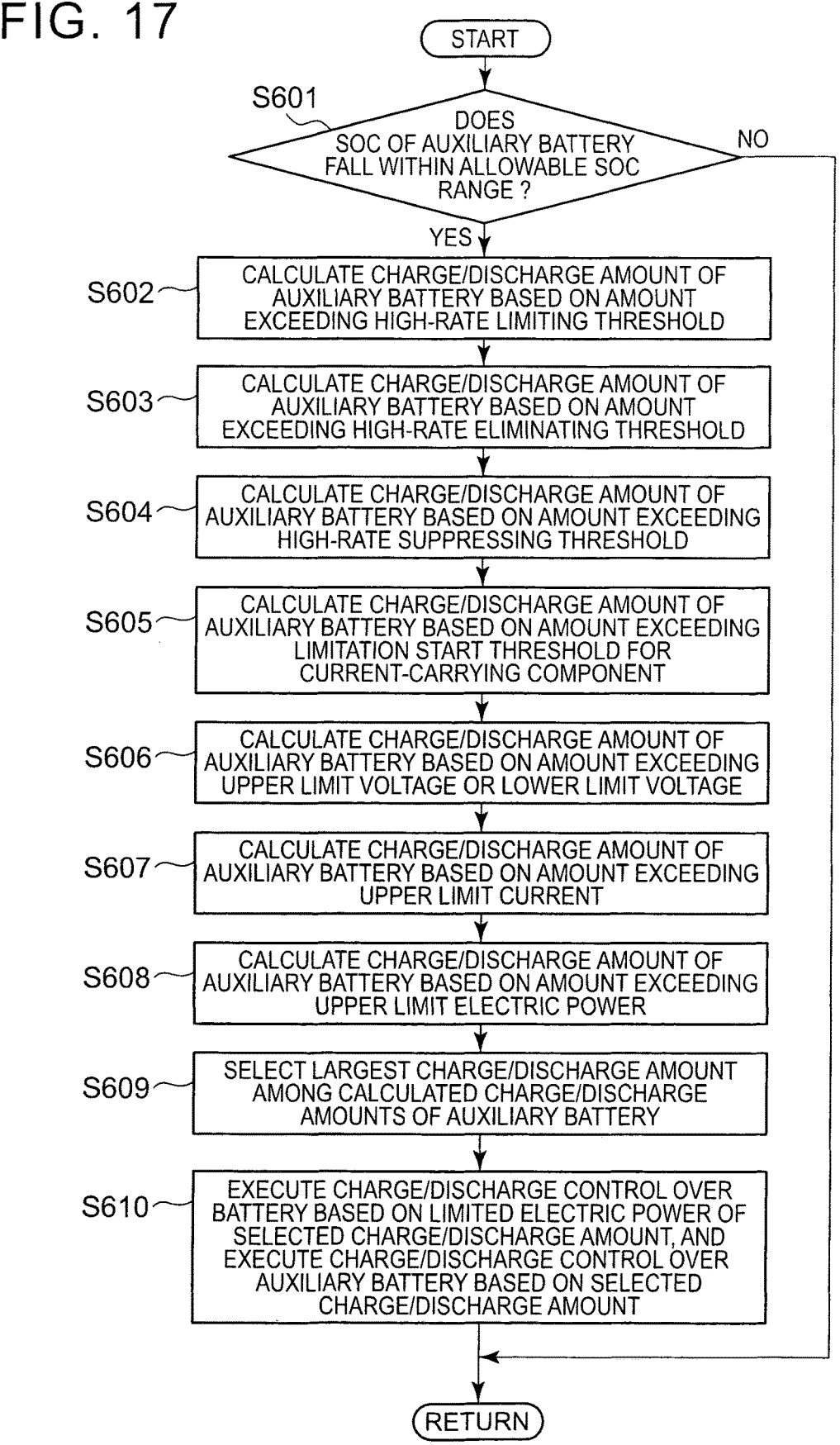
FIG. 17 is a view that shows a control flowchart that, when a plurality of input/output limitation processes are carried out, determines a predetermined pair of input/output limitations and associated charge/discharge control over the auxiliary battery on the basis of a charge/discharge amount of the auxiliary battery, which is required by a corresponding one of the pairs of input/output limitations.

A fifth embodiment will be described. FIG. 17 is a view that shows the fifth embodiment. In the present embodiment, the following mode will be described. In individually imposing input/output limitations on the battery pack 10 and charge/discharge control over the auxiliary battery 40, described in the first to fourth embodiments, the pair of input/output limitations having the largest limited amounts are selected from among the multiple pairs of input/output limitations, the selected pair of input/output limitations are imposed on the battery pack 10, and charge/discharge control over the auxiliary battery 40 is executed. In other words, in the present embodiment, the mode in which the highest pair of charge/discharge powers are selected from among the multiple pairs of charge/discharge powers that are required of the auxiliary battery 40 as a result of input/output limitations on the battery pack 10 will be described.

For example, the controller 30 is able to calculate each of the limited amounts for respectively reducing the allowable output power and the allowable input power on the basis of each pair of first input/output limitations, second input/ output limitations and third input/output limitations. The first input/output limitations are limitations for suppressing high-rate degradation that reduces input/output performance of the battery pack 10 as a result of a bias of the salt concentration in the electrolyte due to charging and discharging of the battery pack 10 as described in the first embodiment. The second input/output limitations are limitations for suppressing an increase in the temperature of the current-carrying components as described in the third embodiment. The third input/output limitations are limitations for suppressing an excess of the upper limit voltage or lower limit voltage of the battery pack 10 as described in the fourth embodiment.

The controller 30 is able to impose the input/output limitations on the battery pack 10, corresponding to the largest limited amounts among the calculated limited amounts, while supplying electric power to the inverter 24 (power supply path) by discharging the auxiliary battery 40 on the basis of the limited amounts, and is able to control the bidirectional DC-DC converter 41 so that part of regenerated electric power is charged into the auxiliary battery 40.

With this configuration, by reducing the allowable output power and allowable input power of the battery pack 10 on the basis of the most necessary limited amounts from among the plurality of pairs of input/output limitations, it is possible to suppress a decrease in drivability for a vehicle request and suppress deterioration of fuel economy while appropriately protecting the battery pack 10.

As in the case of the example of FIG. 17, the first input/output limitations described in the first embodiment may include the high-rate degradation eliminating process and the high-rate degradation suppressing process described in the second embodiment. The third input/output limitations described in the fourth embodiment may include input/output limitations on the battery pack 10 in view of protection against overcurrent or input/output limitations in view of protection of the battery pack 10 against excess electric power.

Thus, as shown in FIG. 17, in charge/discharge control over the battery pack 10 after the ignition switch is turned on, the controller 30 determines whether the SOC of the auxiliary battery 40 falls within the preset allowable SOC range (S601). When the controller 30 determines that the SOC of the auxiliary battery 40 falls within the preset allowable SOC range, the controller 30 is able to execute the process of calculating the charge/discharge amounts of the auxiliary battery 40 based on the amount exceeding the high-rate limiting threshold in step S105 of FIG. 2 (S602), execute the process of calculating the charge/discharge amounts of the auxiliary battery 40 based on the amount exceeding the high-rate eliminating threshold in step S202 or step S205 of FIG. 9 (S603), and execute the process of calculating the charge/discharge amounts of the auxiliary battery 40 based on the amount exceeding the high-rate suppressing threshold in step S302 or step S305 of FIG. 11 (S604). The controller 30 is able to further execute the process of calculating the charge/discharge amounts of the auxiliary battery 40 based on the amount exceeding the limitation start threshold in response to an increase in the temperature of the current-carrying components in step S406 or step S412 of FIG. 14 (S605), execute the process of calculating the charge/discharge amounts of the auxiliary battery 40 based on the amount exceeding the upper limit voltage or lower limit voltage in step S504 of FIG. 16 (S606), execute the process of calculating the charge/discharge amounts of the auxiliary battery 40 based on the amount exceeding the upper limit current as described in the fourth embodiment (S607), and execute the process of calculating the charge/discharge amounts of the auxiliary battery 40 based on the amount exceeding the upper limit values of input and output powers as described in the fourth embodiment (S608).

The controller 30 selects the input/output limitations on the battery pack 10, corresponding to the largest charge/discharge amounts (limited amounts) among the calculated charge/discharge amounts (limited amounts of input/output limitations) of the auxiliary battery 40 (S609). The controller 30 executes charge/discharge control over the battery pack 10 at the input/output limitations, discharges the auxiliary battery 40 on the basis of the calculated charge/discharge amounts so that an insufficient amount of electric power due to the output limitation is compensated, and controls the bidirectional DC-DC converter 41 so that part of regenerated electric power is charged into the auxiliary battery 40 (S610).

In the plurality of input/output limiting processes, for example, when the charge/discharge amounts are not calculated (calculated values are 0) in the process of calculating the charge/discharge amounts of the auxiliary battery 40 based on the amount exceeding the high-rate eliminating threshold in step S202 or step S205 of FIG. 9, step S602 or step S603 may be omitted. That is, when the charge/discharge electric powers do not exceed the thresholds, and the like, in the plurality of input/output limiting processes described in the first to fourth embodiments, in other words, when input/output limitations are not imposed on the battery pack 10, the controller 30 is allowed to omit the processes of calculating the charge/discharge amounts of the auxiliary battery 40 based on the excess amount as described in step S602 to step S608 as needed.

In the example of FIG. 17, the sequence of step S602 to step S608 is selected. The controller 30 is able to calculate the charge/discharge amounts of the auxiliary battery 40 based on the excess amounts described in step S602 to step S608 in descending order of the preset priority, and is able to control the bidirectional DC-DC converter 41 on the basis of the charge/discharge amounts of the auxiliary battery 40 based on the excess amount calculated first. The controller 30 is also able to execute the process of calculating the charge/discharge amounts of the auxiliary battery 40 based on the excess amount in step S602 to step S608 in selected sequence, and is able to select input/output limitations on the battery pack 10, corresponding to larger charge/discharge amounts (limited amounts) of two at the timing at which at least two pairs of charge/discharge amounts are calculated.

In the description and drawings of the first to fifth embodiments, for the sake of easy description, the amounts of changes in discharge control for supplying an insufficient amount of electric power for a required vehicle output and charge control for charging the auxiliary battery 40 with part of regenerated electric power that is not entirely charged into the battery pack 10 are shown. However, charging and discharging of the auxiliary battery 40 include not only the amounts of changes in charging and discharging for an insufficient amount of electric power, and the like, as a result of these input/output limitations on the battery pack 10 but also, as described above, the amounts of changes resulting from supply of electric power to the auxiliary 42 and charging and discharging of a generator, such as an alternator.

The invention claimed is:

1. An electrical storage system comprising:
   a main battery configured to supply electric power to a driving motor of a vehicle;

an auxiliary battery configured to supply electric power to an auxiliary mounted on the vehicle;

a bidirectional DC-DC converter provided between the auxiliary battery and a power supply path from the main battery to the driving motor, the bidirectional DC-DC converter being configured to step down an output voltage from the power supply path to the auxiliary battery, the bidirectional DC-DC converter being configured to step up an output voltage from the auxiliary battery to the power supply path; and a controller configured to:

control charging and discharging of the auxiliary battery;

when an allowable output power of the main battery decreases and an electric power becomes insufficient for a required vehicle output, supply an electric power to the power supply path by discharging the auxiliary battery by using the bidirectional DC-DC converter; and when an allowable input power of the main battery decreases and a regenerated electric power generated by the driving motor is not entirely charged into the main battery, charge part of the regenerated electric power into the auxiliary battery by using the bidirectional DC-DC converter, wherein the main battery is a non-aqueous secondary battery, the controller is configured to control a discharge electric power so that the discharge electric power does not exceed the allowable output power, the controller is configured to calculate an evaluation value, the controller is configured to reduce the allowable output power when the evaluation value exceeds a target value, the controller is configured to, when the evaluation value indicates a state where an ion concentration in an electrolyte of the main battery is biased to a discharge side before the evaluation value exceeds the target value, discharge the auxiliary battery by using the bidirectional DC-DC converter and charge an electric power from the auxiliary battery into the main battery, and the evaluation value is a value for evaluating a degradation component that reduces output performance of the main battery as a result of a bias of the ion concentration due to discharging of the main battery on the basis of a current value during charging and discharging of the main battery.

2. The electrical storage system according to claim 1, wherein the controller is configured to discharge the auxiliary battery by using the bidirectional DC-DC converter continuously after the evaluation value exceeds the target value, and charge an electric power from the auxiliary battery into the main battery.

3. The electrical storage system according to claim 1, wherein the controller is configured to calculate a second evaluation value on the basis of the current value during charging and discharging of the main battery, the controller is configured to reduce the allowable input power when the second evaluation value exceeds a second target value, the controller is configured to, when the evaluation value indicates the state where the ion concentration is biased toward the discharge side, set a target SOC of an SOC of the auxiliary battery to a first SOC value higher than a predetermined SOC value, the controller is configured to, when the second evaluation value indicates a state where the ion concentration is biased toward a charge side, set the target SOC of the SOC of the auxiliary battery to a second SOC value lower than the predetermined SOC value, and control charging and discharging of the auxiliary battery in accordance with the set target SOC, and the second evaluation value is a value for evaluating a degradation component that reduces input performance of the main battery as a result of a bias of the ion concentration in the electrolyte due to charging of the main battery.

4. The electrical storage system according to claim 1, wherein the controller is configured to calculate a limited amount for reducing the allowable output power and a limited amount for reducing the allowable input power on the basis of each of first input/output limitations, second input/output limitations and third input/output limitations, the controller is configured to supply an electric power to the power supply path by discharging the auxiliary battery and charge part of the regenerated electric power into the auxiliary battery on the basis of the calculated largest pair of limited amounts among the pairs of limited amounts, the first input/output limitations, the second input/output limitations and the third input/output limitations are used for a non-aqueous secondary battery as the main battery, the first input/output limitations are limitations for suppressing degradation that reduces input/output performance of the main battery as a result of a bias of an ion concentration in an electrolyte of the main battery due to charging and discharging of the main battery, the second input/output limitations are limitations for suppressing a temperature of a current-carrying component electrically connected to the main battery, and the third input/output limitations are limitations for suppressing an excess of an upper limit voltage or lower limit voltage of the main battery.

* * * * *